(12) United States Patent
Gao et al.

(10) Patent No.: US 12,438,673 B2
(45) Date of Patent: Oct. 7, 2025

(54) SINGLE CORESET BASED PDCCH DIVERSITY OVER MULTIPLE TRPs

(71) Applicant: Telefonaktiebolaget LM Ericsson (publ), Stockholm (SE)

(72) Inventors: Shiwei Gao, Nepean (CA); Mattias Frenne, Uppsala (SE); Siva Muruganathan, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 311 days.

(21) Appl. No.: 17/926,644

(22) PCT Filed: May 22, 2021

(86) PCT No.: PCT/IB2021/054465
§ 371 (c)(1),
(2) Date: Nov. 21, 2022

(87) PCT Pub. No.: WO2021/234678
PCT Pub. Date: Nov. 25, 2021

(65) Prior Publication Data
US 2023/0198721 A1     Jun. 22, 2023

Related U.S. Application Data

(60) Provisional application No. 63/029,050, filed on May 22, 2020.

(51) Int. Cl.
*H04L 5/00* (2006.01)
*H04W 72/232* (2023.01)

(52) U.S. Cl.
CPC .......... *H04L 5/0053* (2013.01); *H04L 5/0023* (2013.01); *H04L 5/0035* (2013.01); *H04L 5/0091* (2013.01); *H04W 72/232* (2023.01)

(58) Field of Classification Search
CPC ... H04W 72/232; H04W 72/20; H04W 72/23; H04L 5/0053; H04L 5/0044;
(Continued)

(56) References Cited

U.S. PATENT DOCUMENTS 9,924,502 B2    3/2018  Choi et al.
10,666,334 B2   5/2020  Xiong et al.
(Continued)

FOREIGN PATENT DOCUMENTS

CN    108352945 A  *  7/2018  .......... H04L 1/0047
CN    110365458 A     10/2019
(Continued)

OTHER PUBLICATIONS

Author Unknown, "Technical Specification Group Radio Access Network; NR; Physical channels and modulation (Release 15)," Technical Specification 38.211, Version 15.6.0, Jun. 2019, 3GPP Organizational Partners, 97 pages.
(Continued)

*Primary Examiner* — Phong La
(74) *Attorney, Agent, or Firm* — Withrow & Terranova, PLLC

(57) ABSTRACT

Systems and methods are disclosed for single Control Resource Set (CORESET) based Physical Downlink Control Channel (PDCCH) diversity over multiple Transmission/Reception Points (TRPs). In one embodiment, a method performed by a wireless communication device comprises receiving a message(s) that activates first and second TCI states for a CORESET comprising first and second sets of resource elements (REs) associated to the first and second TCI states, respectively, and receiving a configuration of PDCCH candidates comprising PDCCH candidates for each of one or more aggregation levels (ALs) in a search space (SS) set. Each PDCCH candidate comprises
(Continued)

REs in the first and second sets of REs. The method further comprises receiving a Downlink Control Information (DCI) carried by: (a) a single PDCCH in one PDCCH candidate or (b) first and second repetitions of a PDCCH in the first and second set of REs, respectively.

20 Claims, 23 Drawing Sheets

(58) Field of Classification Search
CPC ... H04L 5/0048; H04L 5/0058; H04L 5/0047; H04L 5/0035; H04L 5/0031; H04L 5/0032; H04L 5/0033; H04L 5/0037; H04L 5/0091; H04L 5/02; H04L 5/0014; H04L 5/0016

See application file for complete search history.

(56) References Cited

U.S. PATENT DOCUMENTS

| | | | |
|---|---|---|---|
| 11,601,824 B2 | 3/2023 | Hamidi-Sepehr et al. | |
| 2013/0252606 A1 | 9/2013 | Nimbalker et al. | |
| 2018/0279360 A1 | 9/2018 | Park et al. | |
| 2019/0182807 A1 | 6/2019 | Panteleev et al. | |
| 2019/0222357 A1* | 7/2019 | Huang | H04W 72/0446 |
| 2019/0222400 A1 | 7/2019 | Bagheri et al. | |
| 2019/0253308 A1* | 8/2019 | Huang | H04L 43/0823 |
| 2019/0253904 A1 | 8/2019 | Tsai et al. | |
| 2019/0305909 A1 | 10/2019 | Chien et al. | |
| 2019/0373450 A1 | 12/2019 | Zhou et al. | |
| 2020/0008235 A1 | 1/2020 | Sarkis et al. | |
| 2020/0052844 A1 | 2/2020 | Yu et al. | |
| 2020/0100154 A1 | 3/2020 | Cirik et al. | |
| 2020/0106559 A1 | 4/2020 | Mlaipornsawai et al. | |
| 2020/0145062 A1 | 5/2020 | Jung et al. | |
| 2020/0153497 A1 | 5/2020 | Tsai et al. | |
| 2020/0153572 A1 | 5/2020 | Tsai et al. | |
| 2020/0154467 A1 | 5/2020 | Gong et al. | |
| 2020/0314858 A1 | 10/2020 | Xu et al. | |
| 2020/0351896 A1 | 11/2020 | Taherzadeh Boroujeni et al. | |
| 2021/0028843 A1 | 1/2021 | Zhou et al. | |
| 2021/0058971 A1* | 2/2021 | MolavianJazi | H04B 17/318 |
| 2021/0119688 A1 | 4/2021 | Enescu et al. | |
| 2021/0144744 A1 | 5/2021 | Zhou et al. | |
| 2021/0184738 A1 | 6/2021 | Bai et al. | |
| 2021/0195600 A1 | 6/2021 | Khoshnevisan et al. | |
| 2021/0226820 A1* | 7/2021 | Khoshnevisan | H04L 5/0042 |
| 2021/0227418 A1 | 7/2021 | Hwang et al. | |
| 2021/0227525 A1* | 7/2021 | Khoshnevisan | H04L 5/0094 |
| 2021/0258928 A1* | 8/2021 | Khoshnevisan | H04L 5/0091 |
| 2021/0320753 A1 | 10/2021 | Shimezawa et al. | |
| 2021/0321446 A1 | 10/2021 | Lee et al. | |
| 2021/0329611 A1 | 10/2021 | Karjalainen et al. | |
| 2023/0023041 A1* | 1/2023 | Yi | H04L 5/0048 |
| 2023/0040433 A1* | 2/2023 | Zhang | H04L 5/0055 |
| 2023/0106244 A1 | 4/2023 | Yu et al. | |
| 2023/0198721 A1* | 6/2023 | Gao | H04L 5/0082 370/329 |
| 2023/0209561 A1* | 6/2023 | Matsumura | H04W 16/28 370/329 |
| 2024/0031067 A1 | 1/2024 | Gao et al. | |

FOREIGN PATENT DOCUMENTS

| | | | | |
|---|---|---|---|---|
| CN | 110535570 A | | 12/2019 | |
| CN | 111031603 A | * | 4/2020 | H04L 5/0048 |
| CN | 111106914 A | | 5/2020 | |
| CN | 111148239 A | | 5/2020 | |
| EP | 3809650 A1 | | 4/2021 | |
| WO | 2018045092 A1 | | 3/2018 | |
| WO | 2018228487 A1 | | 12/2018 | |
| WO | 2019139955 A1 | | 7/2019 | |
| WO | 201924422 A1 | | 12/2019 | |
| WO | 2019244223 A1 | | 12/2019 | |
| WO | 2020033549 A1 | | 2/2020 | |
| WO | WO-2020033647 A1 | * | 2/2020 | H04L 1/0038 |
| WO | 2020054036 A1 | | 3/2020 | |
| WO | 2020064512 A1 | | 4/2020 | |
| WO | 2020080916 A1 | | 4/2020 | |
| WO | 2020098737 A1 | | 5/2020 | |
| WO | WO-2020153809 A1 | * | 7/2020 | H04B 17/309 |
| WO | 2021156790 A1 | | 8/2021 | |

OTHER PUBLICATIONS

Author Unknown, "Technical Specification Group Radio Access Network; NR; Physical channels and modulation (Release 16)," Technical Specification 38.211, Version 16.0.0, Dec. 2019, 3GPP Organizational Partners, 129 pages.
Author Unknown, "Technical Specification Group Radio Access Network; NR; Multiplexing and channel coding (Release 16)," Technical Specification 38.212, Version 16.0.0, Dec. 2019, 3GPP Organizational Partners, 145 pages.
Author Unknown, "Technical Specification Group Radio Access Network; NR; Physical layer procedures for control (Release 15)," Technical Specification 38.213, Version 1.0.2, Oct. 2017, 3GPP Organizational Partners, 23 pages.
Author Unknown, "Technical Specification Group Radio Access Network; NR; Physical layer procedures for control (Release 15)," Technical Specification 38.213, Version 15.4.0, Dec. 2018, 3GPP Organizational Partners, 104 pages.
Author Unknown, "Technical Specification Group Radio Access Network; NR; Physical layer procedures for control (Release 16)," Technical Specification 38.213, Version 16.1.0, Mar. 2020, 3GPP Organizational Partners, 156 pages.
Author Unknown, "Technical Specification Group Radio Access Network; NR; Physical layer procedures for data (Release 16)," Technical Specification 38.214, Version 16.0.0, Dec. 2019, 3GPP Organizational Partners, 147 pages.
Author Unknown, "Technical Specification Group Radio Access Network; NR; Radio Resource Control (RRC) protocol specification (Release 15)," Technical Specification 38.331, Version 15.1.0, Mar. 2018, 3GPP Organizational Partners, 268 pages.
Catt, "R1-1801750: Discussion on enhanced PDCCH for NR URLLC," 3GPP TSG RAN WG1 Meeting #92, Feb. 26-Mar. 2, 2018, 4 pages.
Catt, "R1-1900339: Consideration on multi-TRP/panel transmission," 3GPP TSG RAN WG1 Ad-Hoc Meeting 1901, Jan. 21-25, 2019, Taipei, Taiwan, 14 pages.
Catt, "R1-1904561: Consideration on multi-TRP/panel transmission," 3GPP TSG RAN WG1 #96bis, Apr. 8-12, 2019, Xi'an, China, 14 pages.
Ericsson, "R1-1900728: On multi-TRP and multi-panel," 3GPP TSG RAN WG1 Meeting Ad-Hoc Meeting 1901, Jan. 21-25, 2019, Taipei, Taiwan, 9 pages.
Ericsson, "R1-1909423: Preliminary results on PDCCH over multi-TRP for URLLC," 3GPP TSG RAN WG1 Meetin RAN1#98, Aug. 26-30, 2019, Prague, Czech Republic, 4 pages.
Nokia, et al., "R1-1813489: Enhancements on Multi-TRP/Panel Transmission," 3GPP TSG RAN WG1 Meeting #95, Nov. 12-16, 2018, Spokane, Washington, 18 pages.
NTT Docomo, et al., "R1-1805063: Necessity of PDCCH repitition," 3GPP TSG RAN WG1 Meeting #92bis, Apr. 16-20, 2018, Sanya, China, 6 pages.
NTT Docomo, et al., "R1-1911184: Enhancements on multi-TRP/panel transmission," 3GPP TSG RAN WG1 #98bis, Oct. 14-20, 2019, Chongqing, China, 32 pages.
Spreadtrum Communications, "R1-1900711: Discussion on Multi-TRP transmission," 3GPP TSG RAN WG1 Meeting #AH1901, Jan. 21-25, 2019, Taipei, Taiwan, 6 pages.
Vivo, "R1-1803847: Discussion on PDCCH repetition for URLLC," 3GPP TSG RAN WG1 Meeting #92bis, Apr. 16-20, 2018, Sanya, China, 6 pages.
International Search Report and Written Opinion for International Patent Application No. PCT/EP2019/075223, mailed Jan. 8, 2020, 10 pages.

(56) References Cited

OTHER PUBLICATIONS

International Search Report and Written Opinion for International Patent Application No. PCT/IB2021/050917, mailed May 10, 2021, 15 pages.
Invitation to Pay Additional Fees and Partial Search for International Patent Application No. PCT/IB2021/054465, mailed Jul. 20, 2021, 27 pages.
International Search Report and Written Opinion for International Patent Application No. PCT/IB2021/054465, mailed Sep. 17, 2021, 28 pages.
Author Unknown, "Technical Specification Group Radio Access Network; NR; Requirements for support of radio resource management (Release 15)," Technical Specification 38.133, Version 15.10.0, Jun. 2020, 3GPP Organizational Partners, 1,161 pages.
Ericsson, "R4-2007382: Transmission scheme in NR PDSCH demodulation requirements for HST," 3GPP TSG-RAN WG4 Meeting #95-e, May 25-Jun. 5, 2020, Electronic Meeting, 3 pages.
Huawei, et al., "R4-1912745: Further discussion on scenarios and transmission schemes for NR Rel-16 HST," 3GPP TSG-RAN WG4 Meeting #92Bis, Oct. 14-18, 2019, Chongqing, China, 4 pages.
Xiaomi, "R1-1902865: Enhancements on Multi-TRP/Panel Transmission," 3GPP TSG RAN WG1 #96, Feb. 25-Mar. 1, 2019, Athens, Greece, 4 pages.
International Search Report and Written Opinion for International Patent Application No. PCT/IB2021/057104, mailed Oct. 26, 2021, 14 pages.
Written Opinion for International Patent Application No. PCT/IB2021/057104, mailed Aug. 31, 2022, 6 pages.
International Preliminary Report on Patentability for International Patent Application No. PCT/IB2021/057104, mailed Nov. 22, 2022, 18 pages.
Non-Final Office Action for U.S. Appl. No. 17/797,634, mailed Sep. 24, 2024, 11 pages.
Author Unknown, "Technical Specification Group Radio Access Network; NR; Physical channels and modulation (Release 16)," Technical Specification 38.211, Version 16.1.0, Mar. 2020, 3GPP Organizational Partners, 130 pages.
Author Unknown, "Technical Specification Group Radio Access Network; NR; Multiplexing and channel coding (Release 16)," Technical Specification 38.212, Version 16.1.0, Mar. 2020, 3GPP Organizational Partners, 146 pages.
Author Unknown, "Technical Specification Group Radio Access Network; NR; Physical layer procedures for data (Release 16)," Technical Specification 38.214, Version 16.1.0, Mar. 2020, 3GPP Organizational Partners, 151 pages.
Author Unknown, "Technical Specification Group Radio Access Network; NR: Medium Access Control (MAC) protocol specification (Release 16)," Technical Specification 38.321, Version 16.0.0, Mar. 2020, 3GPP Organizational Partners, 141 pages.
Author Unknown, "Technical Specification Group Radio Access Network; NR; Radio Resource Control (RRC) protocol specification (Release 16)," Technical Specification 38.331, Version 16.0.0, Mar. 2020, 3GPP Organizational Partners, 835 pages.
ZTE, "R1-1906244: Considerations on beam management for multi-TRP," 3GPP TSG RAN WG1 #97, May 13-17, 2019, Reno, Nevada, 7 pages.
ZTE, et al., "R2-2001465: Consideration on TCI state MAC CE for mTRP mPDCCH transmissions, " 3GPP TSG-RAN WG2 #108, Feb. 14, 2020, 4 pages.
International Search Report and Written Opinion for International Patent Application No. PCT/IB2021/055182, mailed Sep. 21, 2021, 22 pages.
International Preliminary Report on Patentability for International Patent Application No. PCT/IB2021/055182, mailed May 30, 2022, 28 pages.
Catt, "R1-1902019: Consideration on multi-TRP/panel transmission," 3GPP TSG RAN WG1 Meeting #96, Feb. 25-Mar. 1, 2019, Athens, Greece, 11 pages.
Ericsson, "R1-2004633: High Level Views on Rel-17 feMIMO," 3GPP TSG-RAN WG1 Meeting #101-e, May 25-Jun. 5, 2020, Electronic Meeting, 13 pages.
Ericsson, "R1-2006367: On PDCCH, PUCCH and PUSCH robustness," 3GPP TSG-RAN WG1 Meeting #102, Aug. 17-28, 2020, 3GPP TSG-RAN WG1 Meeting #102, Aug. 17-28, 2020, Electronic Meeting 12 pages.
NTT Docomo, Inc., "R1-1900969: PDCCH enhancement for URLLC," 3GPP TSG RAN WG1 Ad-Hoc Meeting 1901, Jan. 21-25, 2019, Taipei, Taiwan, 10 pages.
Qualcomm Incorporated, "R2-2003252: Correction on new DL MIMO MAC CE," 3GPP TSG-RAN WG2 Meeting #109-bis-e, Apr. 20-30, 2020, Electronic Meeting, 10 pages.
Examination Report for European Patent Application No. 21729016.2, mailed Mar. 27, 2024, 5 pages.
Examination Report for European Patent Application No. 21733556.1, mailed Mar. 13, 2024, 4 pages.
Notice of Reasons for Refusal for Japanese Patent Application No. 2022-576204, mailed Mar. 18, 2024, 6 pages.
Decision to Grant for Japanese Patent Application No. 2023-507890, mailed Apr. 2, 2024, 31 pages.
Ericsson, "R1-2004432: Remaining issues on Multi-TRP/Panel Transmission," 3GPP TSG-RAN WG1 Meeting #101-e, May 25-Jun. 5, 2020, Electronic Meeting, 22 pages.
Samsung, "R1-2003918: On Rel. 17 FeMIMO WI," 3GPP TSG RAN WG1 #101, May 25-Jun. 5, 2020, Electronic Meeting, 12 pages.
Vivo, "R1-1717483: NR PDCCH structure," 3GPP TSG RAN WG1 Meeting #90bis, Oct. 9-13, 2017, Prague, Czech Republic, 10 pages.
Notice of Reasons for Rejection for Japanese Patent Application No. 2022-570273, mailed Dec. 5, 2023, 10 pages.
Examination Report No. 1 for Australian Patent Application No. 2021288808, mailed Jul. 7, 2023, 2 pages.
Non-Final Office Action for U.S. Appl. No. 17/279,656, mailed Dec. 7, 2023, 18 pages.
Intel Corporation, "R2-2106645: [AT114-e][035][feMIMO] TCI states indication for PDCCH," 3GPP TSG-RAN WG2 #114-e, May 19-27, 2021, Electronic Meeting, 6 pages.
Decision to Grant for Japanese Patent Application No. 2022-576204, mailed Aug. 9, 2024, 7 pages.
Notice of Allowance for U.S. Appl. No. 17/279,656, mailed Aug. 22, 2024, 7 pages.
First Office Action for Chinese Patent Application No. 202180036804.5, mailed Mar. 6, 2025, 18 pages.
Li, Xiaowen, et al., "Implementation of DCI Format Detection and Transmission Scheme Confirmation of PDSCH in LTE System," Television Technology, vol. 17, Sep. 2, 2013, 6 pages.

\* cited by examiner

FIG. 17

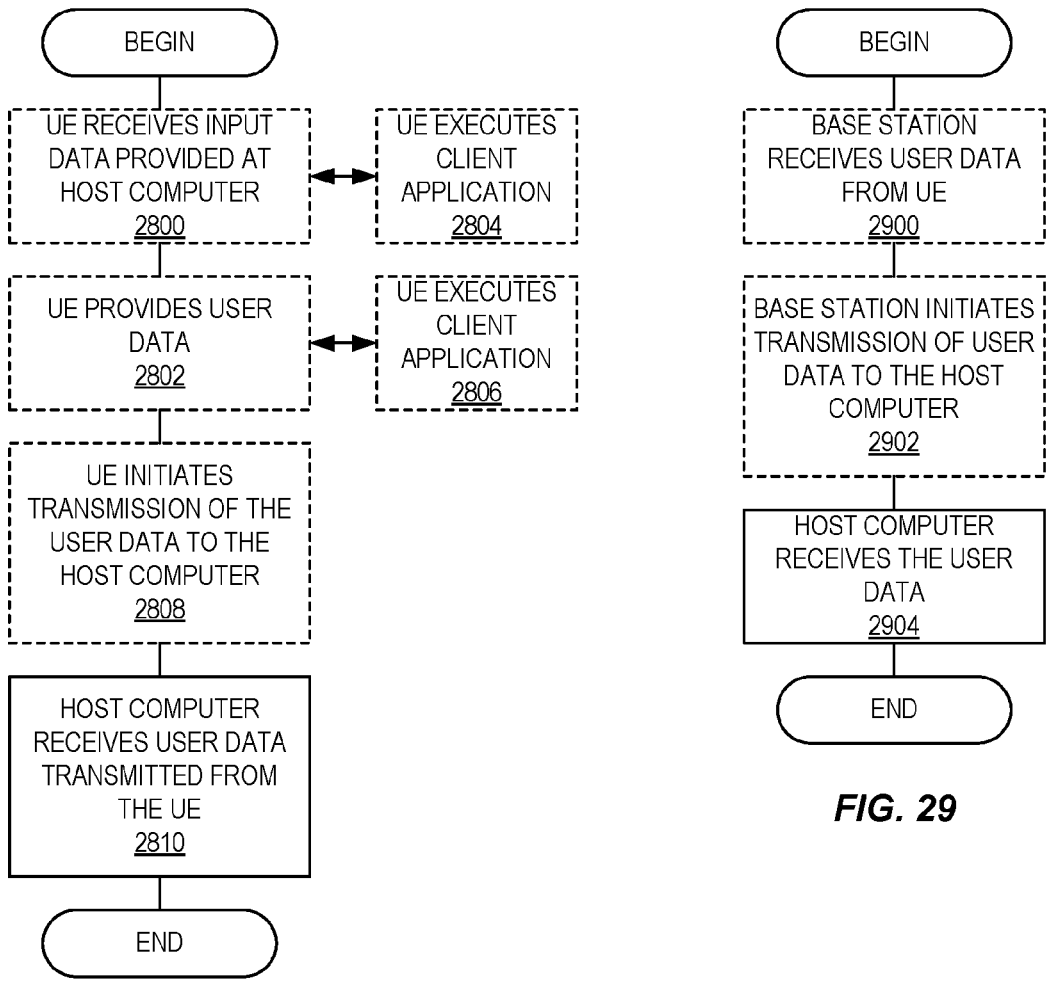

SINGLE CORESET BASED PDCCH DIVERSITY OVER MULTIPLE TRPs

RELATED APPLICATIONS

This application is a 35 U.S.C. § 371 national phase filing of International Application No. PCT/IB2021/054465, filed May 22, 2021, which claims the benefit of provisional patent application Ser. No. 63/029,050, filed May 22, 2020, the disclosures of which are hereby incorporated herein by reference in their entireties.

TECHNICAL FIELD

The present disclosure relates to multiple Transmission/Reception Point (TRP) transmission of Physical Downlink Control Channel (PDCCH) in a wireless network.

BACKGROUND

The next generation mobile wireless communication system (5G), or New Radio (NR), will support a diverse set of use cases and a diverse set of deployment scenarios. The later includes deployment at both low frequencies (below 6 Gigahertz (GHz)) and very high frequencies (up to 10's of GHz).

NR Frame Structure and Resource Grid

NR uses Cyclic Prefix Orthogonal Frequency Division Multiplexing (CP-OFDM) in both downlink (i.e., from a network node, gNB, or base station, to a user equipment or UE) and uplink (i.e., from UE to gNB). Discrete Fourier Transform (DFT) spread Orthogonal Frequency Division Multiplexing (OFDM) is also supported in the uplink. In the time domain, NR downlink and uplink are organized into equally-sized subframes of 1 millisecond (ms) each. A subframe is further divided into multiple slots of equal duration. The slot length depends on subcarrier spacing. For subcarrier spacing of $\Delta f=15$ kilohertz (kHz), there is only one slot per subframe and each slot consists of 14 OFDM symbols.

Data scheduling in NR is typically in slot basis, an example is shown in FIG. 1 with a 14-symbol slot, where the first two symbols contain Physical Downlink Control Channel (PDCCH) and the rest contains physical shared data channel, either Physical Downlink Shared Channel (PDSCH) or Physical Uplink Shared Channel (PUSCH).

Different subcarrier spacing values are supported in NR. The supported subcarrier spacing values (also referred to as different numerologies) are given by $\Delta f=(15\times 2^\mu)$kHz where $\mu \in 0,1,2,3,4$. $\Delta f=15$ kHz is the basic subcarrier spacing. The slot durations at different subcarrier spacings is given by $1/2^\mu$ ms.

In the frequency domain, a system bandwidth is divided into Resource Blocks (RBs), each corresponding to 12 contiguous subcarriers. The RBs are numbered starting with 0 from one end of the system bandwidth. The basic NR physical time-frequency resource grid is illustrated in FIG. 2, where only one RB within a 14-symbol slot is shown. One OFDM subcarrier during one OFDM symbol interval forms one Resource Element (RE).

Downlink (DL) transmissions can be dynamically scheduled, i.e., in each slot the gNB transmits Downlink Control Information (DCI) over Physical Downlink Control Channel (PDCCH) about which UE data is to be transmitted to and which RBs in the current downlink slot the data is transmitted on. The UE data are carried on PDSCH.

There are three DCI formats defined for scheduling PDSCH in NR, i.e., DCI format 1_0, DCI format 1_1, and DCI format 1_2. DCI format 1_0 has a smallest size and can be used when a UE is not fully connected to the network while DCI format 1_1 can be used for scheduling Multiple-Input-Multiple-Output (MIMO) transmissions with two Transport Blocks (TBs). DCI format 1_2 supports configurable sizes for some fields in the DCI so that a smaller DCI size than DCI format 1_1 can be configured.

In downlink, a UE first detects and decodes a PDCCH and, if the decoding is successful, it then decodes the corresponding PDSCH based on the decoded control information in the PDCCH.

Similar to downlink, a UE first decodes uplink grants in a PDCCH and then transmits data over PUSCH based the decoded control information in the uplink grant such as modulation order, coding rate, uplink resource allocation, etc.

Quasi Co-Location and Transmit Configuration Indicator (TCI) States

Several signals can be transmitted from different antenna ports of a same base station. These signals can have the same large-scale properties such as Doppler shift/spread, average delay spread, or average delay. These antenna ports are then said to be Quasi Co-Located (QCL).

If the UE knows that two antenna ports are QCL with respect to a certain parameter (e.g., Doppler spread), the UE can estimate that parameter based on one of the antenna ports and apply that estimate for receiving signal on the other antenna port. Typically, the first antenna port is represented by a measurement reference signal such as Channel State Information Reference Signal (CSI-RS) or Synchronization Signal and Physical Broadcast Channel (PBCH) Block (SSB), known as a source Reference Signal (RS), and the second antenna port is a Demodulation Reference Signal (DMRS), known as a target RS.

For instance, if antenna ports A and B are QCL with respect to average delay, the UE can estimate the average delay from the signal received from antenna port A and assume that the signal received from antenna port B has the same average delay. This is useful for demodulation since the UE can know beforehand the properties of the channel, which for instance helps the UE in selecting an appropriate channel estimation filter.

Information about what assumptions can be made regarding QCL is signaled to the UE from the network. In NR, four types of QCL relations between a transmitted source RS and transmitted target RS were defined:

Type A: {Doppler shift, Doppler spread, average delay, delay spread}
Type B: {Doppler shift, Doppler spread}
Type C: {average delay, Doppler shift}
Type D: {Spatial Rx parameter}

QCL type D was introduced to facilitate beam management with analog beamforming and is known as spatial QCL. There is currently no strict definition of spatial QCL, but the understanding is that if two transmitted antenna ports are spatially QCL, the UE can use the same receive (Rx) beam to receive them.

For dynamic beam and/or transmission/reception point (TRP) selection, a UE can be configured through Radio Resource Control (RRC) signaling with up to 128 Transmit Configuration Indicator (TCI) states for PDSCH in frequency range 2 (FR2) and up to 8 in frequency range 1 (FR1), depending on UE capability. In NR, FR1 refers to frequencies between 410 MHz-7125 MHz while FR2 refers to frequencies between 24250 MHz-52600 MHz.

Each TCI state contains QCL information, i.e. one or two source DL RSs, each source RS associated with a QCL type. For example, a TCI state contains a pair of reference signals, each associated with a QCL type, e.g. two different CSI-RSs {CSI-RS1, CSI-RS2} is configured in the TCI state as {qcl-Type1,qcl-Type2}={Type A, Type D}. This means the UE can derive Doppler shift, Doppler spread, average delay, and delay spread from CSI-RS1 and Spatial Rx parameter (i.e., the Rx beam to use) from CSI-RS2.

The list of TCI states can be interpreted as a list of possible beams transmitted from the network or a list of possible TRPs used by the network to communicate with the UE.

For PDSCH transmission, up to 8 different TCI states may be activated and mapped to 8 TCI code points in a DCI, where each code point can be mapped to one or two different TCI states. A UE may be dynamically indicated by a TCI codepoint in DCI one or two of the activated TCI states for PDSCH reception. The UE shall use the TCI-State according to the value of the 'Transmission Configuration Indication' field in the detected PDCCH with DCI for determining PDSCH antenna port quasi co-location.

Default TCI state(s): If none of the TCI codepoints are mapped to more than a single TCI state and the offset between the reception of a DL DCI and the corresponding PDSCH is less than a threshold timeDurationForQCL configured by higher layers, the UE may assume that the DM-RS ports of the PDSCH are quasi co-located with the RS(s) in an activated TCI state for a Control Resource Set (CORESET) with the lowest CORESET-ID in the latest slot in which one or more CORESETs within the active bandwidth part (BWP) of the serving cell are monitored by the UE.

If the offset between the reception of the DL DCI and the corresponding PDSCH is less than the threshold timeDurationForQCL and at least one configured TCI states for the serving cell of scheduled PDSCH contains the 'QCL-TypeD', and at least one TCI codepoint indicates two TCI states, the UE may assume that the DM-RS ports of the PDSCH are quasi co-located with the RS(s) with respect to the QCL parameter(s) associated with the TCI states corresponding to the lowest codepoint among the TCI codepoints containing two different TCI states.

CORESET and Search Space

A UE monitors a set of PDCCH candidates in one or more CORESETs on an active DL BWP on each activated serving cell configured with PDCCH monitoring according to corresponding search space sets, where PDCCH monitoring implies decoding each PDCCH candidate according to the monitored DCI formats. A PDCCH candidate can occupy one or more Control-Channel Elements (CCEs), where the number of CCEs for a PDCCH candidate is also referred to as an aggregation level (AL). ALs of 1, 2, 4, 8, and 16 are supported in NR. A set of PDCCH candidates for a UE to monitor is defined in terms of PDCCH search space sets. A search space set can be a Common Search Space (CSS) set or a UE Specific Search Space (USS) set. A UE can be configured with up to 10 sets of search spaces per BWP for monitoring PDCCH candidates.

A CORESET consists of $N_{RB}^{CORESET}$ resource blocks in the frequency domain and $N_{symb}^{CORESET} \in \{1,2,3\}$ consecutive OFDM symbols in the time domain. For each DL BWP configured to a UE in a serving cell, a UE can be provided by higher layer signaling with P≤5 CORESETs. For each CORESET, a UE is configured by RRC signaling with a CORESET information element (IE), which includes the following:

- a CORESET index p, 0≤p<16;
- a DM-RS scrambling sequence initialization value;
- a precoder granularity for a number of resource element groups (REGs) in the frequency domain where the UE can assume use of a same DM-RS precoder;
- a number of consecutive symbols;
- a set of RBs;
- CCE-to-REG mapping parameters (interleaved or non-interleaved);
- a list of up to 64 TCI-States can be configured in a CORESET p. These TCI states are used to provide QCL relationships between the source DL RS(s) in one RS Set in the TCI State and the PDCCH DMRS ports (i.e., for DMRS ports for PDCCHs received in one of the search spaces defined over CORESET p). The source DL RS(s) can either be a CSI-RS or SSB;
- an indication for a presence or absence of a TCI field for DCI format 1_1 transmitted by a PDCCH in CORESET p. This is done by the field 'tci-PresentInDCI' In the 'tci-PresentInDCI' field is absent in the CORESET IE corresponding to CORESET p, then the UE considers the TCI field to be absent/disabled when scheduling is done via DCI format 1_1. The corresponding field for indicating a presence or absence of a TCI field for DCI format 1_2 is given by 'tci-PresentInDCI-ForDCIFormat1_2'.

For each CORESET, only one TCI state from the list of TCI states is activated by Medium Access Control (MAC) Control Element (CE) in NR. The activated TCI state indicates quasi co-location information of the DMRS antenna port for PDCCH reception in the CORESET.

A CCE consists of 6 REGs, where a REG equals the REs in one RB during one OFDM symbol. REGs in a CORESET are numbered in increasing order in a time-first manner, starting with 0 for the first OFDM symbol and the lowest-numbered RB in the CORESET. REGs are further arranged in REG bundles (REGBs), each REG bundle can have 2, 3, or 6 REGs, depending on the number of OFDM symbols configured for the CORESET (i.e., 2 or 6 REGs for $N_{symb}^{CORESET}=1$ and 2, and 3 or 6 REGs for $N_{symb}^{CORESET}=3$). REG bundles may be configured by higher layer signaling to be interleaved or non-interleaved before being mapped to CCEs. An example of non-interleaved REG bundles, i.e. non-interleaved CCE to REG mapping, is shown in FIG. 3 for a CORESET with 2 OFDM symbols and 48 RBs. Note that for non-interleaved CCE to REG mapping, only REG bundle size of 6 REGs is applicable and each CCE is mapped to 6 consecutive REGs in this case.

An example of interleaved REG bundles, i.e. interleaved CCE to REG mapping, is shown in FIG. 4 with interleaving size of 3 and REG bundle size of 2 REGs for the same CORESET in FIG. 3. Note that in this case, each CCE is mapped to 3 REG bundles (i.e., 6 REGs) that are spread over different RBs in the frequency domain. This achieves better frequency diversity compared to the non-interleaved case.

The precoding granularity in a CORESET can be configured as either "sameAsREG-bundle" or "allContiguousRBs". When "sameAsREG-bundle" is configured, a UE assumes that all DMRS in a REG bundle are precoded the same and thus can be used together for channel estimation in the REG bundle. Note that a REG bundle always contains one or more consecutive RBs. When "allContiguousRBs" is configured, a UE assumes that all DMRS in a set of consecutive RBs in the CORESET are precoded the same and thus can be used together for channel estimation in the RBs. DMRS allocations in each REG are shown in FIG. 5.

A Search Space (SS) set is associated with a CORESET. For each DL BWP configured to a UE in a serving cell, the UE is provided by higher layers with S≤10 SS sets where, for each SS set from the S SS sets, the UE is provided the following information by higher layers:

- a search space set index s, 0≤s<40,
- an association between the search space set s and a CORESET
- a PDCCH monitoring periodicity of $k_s$ slots and a PDCCH monitoring offset of $o_s$ slots,
- a PDCCH monitoring pattern within a slot, indicating first symbol(s) of the CORESET within a slot for PDCCH monitoring,
- a duration of $T_s < k_s$ slots indicating a number of slots that the search space set s exists,
- a number of PDCCH candidates $m_s^{(L)}$ per CCE aggregation level L,
- an indication that search space set s is either a CSS set or a USS set, and
- DCI formats to monitor.

For search space set s, the UE determines that a PDCCH monitoring occasion(s) exists in a slot with slot number $n_{s,f}^\mu$ in a frame with frame number $n_f$ if $(n_f \cdot N_{slot}^{frame,\mu} + n_{s,f}^\mu - o_s)$ mod $k_s = 0$, where $N_{slot}^{frame,\mu}$ is the number of slots per radio frame. The UE monitors PDCCH for search space set s for $T_s$ consecutive slots, starting from slot $n_{s,f}^\mu$, and does not monitor PDCCH for search space set s for the next $k_s - T_s$ consecutive slots.

The mapping of PDCCH candidates in an SS set to CCEs of the associated CORESET p is implemented by means of a hash function defined in section 10.1 of 3GPP Technical Specification (TS) 38.213 V16.1.0. The hash function randomizes the allocation of the PDCCH candidates within the CORESET.

For a SS set s associated with CORESET p, the CCE indexes for aggregation level L corresponding to PDCCH candidate m (m=0, 1, . . . , $M^{(L)}$−1) of the SS set in slot $n_s$ for an active DL BWP of a serving cell are given by $$L\{(Y_{p,n_s} + Z_{m,p}^{(L)}) \bmod \lfloor N_{CCE,p}/L \rfloor \} + i$$

where $Y_{p,n_s} = 0$ for CSS and is a pseudo-random variable based on the Cell Radio Network Temporary Identifier (C-RNTI) of the UE for USS, the CORESET index p, and slot number $n_s$; $N_{CCE,p}$ is the number of CCEs in the CORESET; $M^{(L)}$ is the number of PDCCH candidates configured for aggregation level L; i (0, 1, . . . , L−1) is the contiguous CCE index of the PDCCH candidate m;

$$Z_{m,p}^{(L)} = \left\lfloor \frac{m \cdot N_{CCE,p}}{L \cdot M^{(L)}} \right\rfloor,$$

$\lfloor \cdot \rfloor$ denotes the floor operation.

FIG. 6 shows an example of PDCCH candidate to CCE mapping for different ALs. In the next slot, the positions of these candidates are changed, in order to provide randomization. In particular, FIG. 6 shows an example of PDCCH candidates in a SS set associated with a CORESET with 16 CCEs and with $M^{(1)}=4$, $M^{(2)}=2$, and $M^{(4)}=1$ configured. Note that candidates of different ALs are overlapped in some CCEs, more specifically they start from the same CCE in order to minimize the number of CCEs the UE need to demodulate to receive all the PDCCH candidates with different ALs.

NR HARQ ACK/NACK Feedback Over PUCCH

When receiving a PDSCH in the downlink from a serving gNB at slot n, a UE feeds back a Hybrid Automatic Repeat Request (HARQ) Acknowledgement (ACK) at slot n+k over a PUCCH resource in the uplink to the gNB if the PDSCH is decoded successfully; otherwise, the UE sends a HARQ Negative ACK (NACK) at slot n+k to the gNB to indicate that the PDSCH is not decoded successfully.

In NR, up to four PUCCH resource sets can be configured to a UE. A PUCCH resource set with pucch-ResourceSetId=0 can have up to 32 PUCCH resources while for PUCCH resource sets with pucch-ResourceSetId=1 to 3, each set can have up to 8 PUCCH resources. A UE determines the PUCCH resource set in a slot based on the number of aggregated Uplink Control Information (UCI) bits to be sent in the slot. The UCI bits consist of HARQ ACK/NACK, scheduling request (SR), and channel state information (CSI) bits.

A 3 bits PUCCH Resource Indication (PRI) field in DCI maps to a PUCCH resource in a set of PUCCH resources with a maximum of eight PUCCH resources. For the first set of PUCCH resources with pucch-ResourceSetId=0 and when the number of PUCCH resources, $R_{PUCCH}$, in the set is larger than eight, the UE determines a PUCCH resource with index $r_{PUCCH}$, $0 \le r_{PUCCH} \le R_{PUCCH} - 1$, for carrying HARQ-ACK information in response to detecting a last DCI format 1_0 or DCI format 1_1 in a PDCCH reception, among DCI formats 1_0 or DCI formats 1_1 the UE received with a value of the PDSCH-to-HARQ_feedback timing indicator field indicating a same slot for the PUCCH transmission, as $$r_{PUCCH} = \begin{cases} \left\lfloor \frac{n_{CCE,p} \cdot \lfloor R_{PUCCH}/8 \rfloor}{N_{CCE,p}} \right\rfloor + \Delta_{PRI} \cdot \left\lfloor \frac{R_{PUCCH}}{8} \right\rfloor & \text{if } \Delta_{PRI} < R_{PUCCH} \bmod 8 \\ \left\lfloor \frac{n_{CCE,p} \cdot \lfloor R_{PUCCH}/8 \rfloor}{N_{CCE,p}} \right\rfloor + \Delta_{PRI} \cdot \left\lfloor \frac{R_{PUCCH}}{8} \right\rfloor + R_{PUCCH} \bmod 8 & \text{if } \Delta_{PRI} \ge R_{PUCCH} \bmod 8 \end{cases}$$

where $N_{CCE,p}$ is a number of CCEs in CORESET p of the PDCCH reception for the DCI format 1_0 or DCI format 1_1 as described in Subclause 10.1 of 3GPP TS 38.213 V16.1.0, $n_{CCE,p}$ is the index of a first CCE for the PDCCH reception, and $\Delta_{PRI}$ is a value of the PUCCH resource indicator field in the DCI format 1_0 or DCI format 1_1.

Ultra-Reliable Low Latency (URLLC) Data Transmission Over Multiple Transmission Points Reliable PDSCH transmission with multiple panels or TRPs has been introduced in 3GPP for NR Release 16, in which a transport block may be transmitted over multiple TRPs to achieve diversity. Reliability is achieved by transmitting different layers of a codeword (CW) for a TB on the same resource over two TRPs (Scheme 1a), or different parts of a CW on different frequency resources over two TRPs (Scheme 2a), or by repeating the same TB (with a same or different CWs) over two TRPs in time (Schemes 3 and 4) or frequency domain (Scheme 2b). For all these schemes, two TCI states are indicated via the 'Transmission Configuration Indication' field in a DCI scheduling the PDSCH.

In NR Release 17, it has been proposed to further introduce PDCCH enhancement with multiple TRPs as shown in FIG. 7. Three methods were proposed so far, see R1-1911184, "Enhancements on multi-TRP/panel transmission", NTT DOCOMO, 3gpp RAN1 #98bis, Chongqing, China, Oct. 14-20, 2019, and R1-1909423, "Preliminary results on PDCCH over multi-TRP for URLLC", Ericsson, 3GPP RAN1 #98, Prague, Czech Republic, 26-30 Aug. 2019. These three methods are:

1. CCE interleaving:
   A PDCCH with aggregation level L is mapped to two CORESETs each associated with one TRP, in which half of the L CCEs are allocated in each of the two CORESETs.
2. PDCCH repetition without soft combining
   A PDCCH is repeated over two CORESETs each associated with one TRP. The PDCCH is considered successfully decoded if one of the repetitions is decoded successfully. No soft combining is performed at the UE.
3. PDCCH repetition with soft combining
   A PDCCH is repeated over two CORESETs each associated with one TRP. Soft combining is performed before PDCCH decoding, and the UE needs to know that a certain PDCCH candidate in a first CORESET corresponds to another PDCCH candidate in a second CORESET.

It is shown in R1-1911184 and R1-1909423 that, in the presence of channel blocking or deep fading, all the three multi-TRP schemes provide better Block Error Rate (BLER) performance for the PDCCH reception than PDCCH transmission over single TRP. In absence of channel blocking or deep fading, CCE interleaving and PDCCH repetition with soft combining provide better BLER performance than single TRP while PDCCH repetition without soft combining performs similar as single TRP.

SUMMARY

Systems and methods are disclosed herein for single Control Resource Set (CORESET) based Physical Downlink Control Channel (PDCCH) diversity over multiple Transmission/Reception Points (TRPs). In one embodiment, a method of operation of a wireless communication device for Downlink Control Information (DCI) reception using multiple transmission configuration indication (TCI) states in a wireless network comprises receiving, from a radio access node, one or more messages that activate a first TCI state and a second TCI state for a CORESET comprising a first set of resource elements (REs) associated to the first TCI state and a second set of REs associated to the second TCI state. The method further comprises receiving, from a radio access node, a configuration of: a search space (SS) set associated with the CORESET, one or more aggregation levels (ALs), and a plurality of PDCCH candidates comprising PDCCH candidates for each of the one or more ALs in the SS set, wherein each PDCCH candidate comprises REs in the first set of REs and REs in the second set of REs. The method further comprises receiving a DCI carried by either: (a) a single PDCCH in one of the plurality of PDCCH candidates that comprises REs in the first set of REs and REs in the second set of REs or (b) a first repetition of a PDCCH in the first set of REs and a second repetition of the PDCCH in the second set of REs. In this manner, with a single CORESET activated with multiple TCI states, PDCCH diversity over multiple TRPs is supported.

In one embodiment, only one of the first and second TCI states is used for the purpose of defining a default TCI state for Physical Downlink Shared Channel (PDSCH).

In one embodiment, only one of the first and second TCI states is used for the purpose of defining a default TCI state for PDSCH when a time offset between reception of a downlink DCI and a corresponding PDSCH is less than a threshold.

In one embodiment, the wireless communication device assumes that one or more Demodulation Reference Signal (DM-RS) ports of a PDSCH of a serving cell are quasi co-located (QCL) with one or more reference signals with respect to one or more QCL parameters used for PDCCH quasi co-location indication in the first activated TCI state of the CORESET if the CORESET has a lowest CORESET identity (ID) in a latest slot in which one or more CORESETs within an active bandwidth part of the serving cell are monitored by the wireless communication device if a time offset between a downlink DCI scheduling the PDSCH and the PDSCH is less than a threshold.

In one embodiment, the CORESET further comprises a plurality of Resource Blocks (RBs) in the frequency domain and a number of Orthogonal Frequency Division Multiplexing (OFDM) symbols in the time domain. In one embodiment, the CORESET further comprises a plurality of RE groups (REGs) each consisting of twelve REs in an RB in an OFDM symbol in the CORESET and indexed first in ascending order of OFDM symbols and then in ascending order of RBs starting from a lowest RB in the CORESET. In one embodiment, the CORESET further comprises a number of REG bundles (REGBs) each consisting of one or more consecutive REGs. In one embodiment, the CORESET further comprises a number of control channel elements (CCEs) each consisting of one or more of the plurality of REGBs.

In one embodiment, the first set of REs and the second set of REs are respectively a first set of REGs and a second set of REGs. In one embodiment, a mapping of a REG to the first set of REGs associated to the first TCI state or the second set of REGs associated to the second TCI state is based on: (a) an index of the REG, (b) an OFDM symbol in which the REG is located, (c) a location of the REG within a respective REG bundle, (d) the REG bundle or a CCE to which the REG belongs, (e) a CORESET configuration of the CORESET on precoding granularity, (f) a CCE to REG mapping, (g) number of OFDM symbols, or (h) a combination of two or more of (a)-(g). In one embodiment, the first set of REGs and the second sets of REGs are interleaved such that the first set of REGs are REGs with even numbered indices and the second set of REGs are REGs with odd numbered indices, or vice versa. In one embodiment, the CORESET further comprises a plurality of REGBs each consisting of two or more REGs, the first set of REGs consists of a first REG in each of the REGBs, and the second set of REGs consists of a second REG in each of the REGBs. In one embodiment, the first REG and the second REG in each REGB are REGs in a first OFDM symbol and a second OFDM symbol, respectively, wherein the first OFDM symbol and the second OFDM symbols are different OFDM symbols. In one embodiment, the first REG and the second REG in each REGB are REGs in a same OFDM symbol. In one embodiment, the first REGs in the plurality of REG bundles and the second REGs in the plurality of REG bundles are a first half and a second half of a plurality of consecutive REGs, respectively.

In one embodiment, the CORESET further comprises a plurality of REGBs each consisting of two or more REGs, the first set of REGs consists of a first k REGs in each of the REGBs, and the second set of REGs consists of a second k REGs in each of the REGBs, where k is an integer number equal to a number of REG bundles in the plurality of REG bundles divided by a number of activated TCI states for the CORESET.

In one embodiment, the CORESET further comprises a plurality of REGBs each consisting of two or more REGs, the first set of REGs consists of REGs in a first number of OFDM symbols of the CORESET, and the second set of REGs consists of a remaining number of OFDM symbols of the CORESET.

In one embodiment, the first set of REs and the second sets of REs are respectively a first set of REGBs and a second set of REGBs. In one embodiment, the first set of REGBs is a set of even numbered REGBs and the second set of REGBs is a set of odd numbered REGBs, or vice versa. In one embodiment, the CORESET further comprises a number of CCEs each consisting of two or more REGBs, and the first set of REGBs and the second set of REGBs are respectively a first REGB and a second REGB in each of the CCEs. In one embodiment, the first REGBs in each of the CCEs and the second REGB in each of the CCEs are respectively a first half and a second half of consecutive REGBs in each of the CCEs.

In one embodiment, the first set of REs and the second set of REs are respectively a first set of CCEs and a second set of CCEs. In one embodiment, the first set of CCEs are even numbered CCEs and the second set of CCEs are odd numbered CCEs, or vice versa. In one embodiment, the first set of CCEs and the second set of CCEs are respectively a first half and a second half of consecutive CCEs in the CORESET.

In one embodiment, the first TCI state and the second TCI state are associated with a first downlink reference signal, RS, and a second downlink RS, respectively.

In one embodiment, each of the PDCCH candidates comprises one or more CCEs.

In one embodiment, receiving the DCI comprises receiving the DCI carried by the single PDCCH in the one of the number of PDCCH candidates comprising REs in the first set of REs and REs in the second sets of REs, and receiving the DCI further comprises determining the first set of REs and the second sets of REs in one or more CCEs associated with the PDCCH candidate and performing channel estimation based on demodulation signal, DMRS, in the first set of REs and second set of REs in the one or more CCEs associated with the PDCCH candidate by assuming QCL with a first and the second downlink RS indicated by the first and second TCI states, respectively.

In one embodiment, receiving the DCI comprises receiving the DCI carried by the first repetition of the PDCCH in the first set of REs and the second repetition of the PDCCH in the second set of REs, and the first repetition of the PDCCH and the second repetition of the PDCCH are received in one or more CCEs associated with one of the PDCCH candidates. In one embodiment, receiving the DCI comprises receiving the DCI carried by the first repetition of the PDCCH in the first set of REs and the second repetition of the PDCCH in the second set of REs, and receiving the DCI further comprises determining the first set of REs and the second sets of REs in the CCEs and performing channel estimation based demodulation signal, DMRS, in the first and second sets of REs in the one or more CCEs associated with the one of the PDCCH candidates by assuming quasi co-location with the first or the second downlink RS, respectively. In one embodiment, receiving the DCI comprises receiving the DCI carried by the first repetition of the PDCCH in the first set of REs and the second repetition of the PDCCH in the second set of REs, wherein the first repetition of the PDCCH and the second repetition of the PDCCH are decoded together by combining signals received in the first and the second sets of REs in the CCEs after channel estimation, or separately.

In one embodiment, the method further comprises determining a time offset between reception of the DCI and a corresponding physical channel or signal as a number of symbols between a last symbol of the CORESET in the SS and a first symbol of the physical channel or signal.

In one embodiment, receiving the DCI comprises receiving the DCI carried by the first repetition of the PDCCH in the first set of REs and the second repetition of the PDCCH in the second set of REs, wherein the first set of REs and the second set of REs in one or more CCEs associated to the first repetition of the PDCCH and the second repetition of the PDCCH are assumed not available for PDSCH scheduled by the DCI by the wireless communication device.

In one embodiment, the first TCI state and the second TCI state are associated with a first downlink reference signal (RS) and a second downlink RS, respectively, and the method further comprises applying the first downlink RS as QCL source for PDSCH reception, pathloss RS for uplink power control, or link monitoring RS for link monitoring (e.g., if certain conditions are met and the CORESET has the lowest ID or lowest ID in a slot).

Corresponding embodiments of a wireless communication device are also disclosed. In one embodiment, a wireless communication device for DCI reception using multiple TCI states, in a wireless network, is adapted to receive, from a radio access node, one or more messages that activate a first TCI state and a second TCI state for a CORESET comprising a first set of REs, associated to the first TCI state and a second set of REs associated to the second TCI state. The wireless communication device is further adapted to receive, from a radio access node, a configuration of: a SS set associated with the CORESET, one or more ALs and a plurality of PDCCH candidates comprising PDCCH candidates for each of the one or more ALs in the SS set, wherein each PDCCH candidate comprises REs in the first set of REs and REs in the second set of Res. The wireless communication device is further adapted to receive a DCI carried by either: (a) a single PDCCH in one of the plurality of PDCCH candidates that comprises REs in the first set of REs and REs in the second set of Res or (b) a first repetition of a PDCCH in the first set of REs and a second repetition of the PDCCH in the second set of REs.

In one embodiment, a wireless communication device for DCI reception using multiple TCI states, in a wireless network, comprises one or more transmitters, one or more receivers, and processing circuitry associated with the one or more transmitters and the one or more receivers. The processing circuitry is configured to cause the wireless communication device to receive, from a radio access node, one or more messages that activate a first TCI state and a second TCI state for a CORESET comprising a first set of REs, associated to the first TCI state and a second set of REs associated to the second TCI state. The processing circuitry is further configured to cause the wireless communication device to receive, from a radio access node, a configuration of: a SS set associated with the CORESET, one or more ALs and a plurality of PDCCH candidates comprising PDCCH candidates for each of the one or more ALs in the SS set, wherein each PDCCH candidate comprises REs in the first set of REs and REs in the second set of Res. The processing circuitry is further configured to cause the wireless communication device to receive a DCI carried by either: (a) a single PDCCH in one of the plurality of PDCCH candidates that comprises REs in the first set of REs and REs in the second set of Res or (b) a first repetition of a PDCCH in the first set of REs and a second repetition of the PDCCH in the second set of REs.

Embodiments of a method of operation of a radio access node are also disclosed herein. In one embodiment, a method of operation of a radio access node for DCI transmission using multiple TCI states, in a wireless network, comprises providing, to a wireless communication device, one or more messages that activate a first TCI state and a second TCI state for a CORESET comprising a first set of REs associated to the first TCI state and a second set of REs associated to the second TCI state. The method further comprises sending, to the wireless communication device, a configuration of: a SS set associated with the CORESET, one or more ALs, and a plurality of PDCCH candidates comprising PDCCH candidates for each of the one or more ALs in the SS set, wherein each PDCCH candidate comprises REs in the first set of REs and REs in the second set of REs. A DCI is transmitted to the wireless communication device, and the DCI is carried by either: (a) a single PDCCH in one of the plurality of PDCCH candidates that comprises REs in the first set of REs and REs in the second sets of REs or (b) a first repetition of a PDCCH in the first set of REs and a second PDCCH a second repetition of the PDCCH in the second set of REs.

Corresponding embodiments of a radio access node are also disclosed. In one embodiment, a radio access node for DCI transmission using multiple TCI states, in a wireless network, is adapted to provide, to a wireless communication device, one or more messages that activate a first TCI state and a second TCI state for a CORESET comprising a first set of REs associated to the first TCI state and a second set of REs associated to the second TCI state. The radio access node is further adapted to send, to the wireless communication device, a configuration of: a SS set associated with the CORESET, one or more ALs, and a plurality of PDCCH candidates comprising PDCCH candidates for each of the one or more ALs in the SS set, wherein each PDCCH candidate comprises REs in the first set of REs and REs in the second set of REs. A DCI is transmitted to the wireless communication device, and the DCI is carried by either: (a) a single PDCCH in one of the plurality of PDCCH candidates that comprises REs in the first set of REs and REs in the second sets of REs or (b) a first repetition of a PDCCH in the first set of REs and a second PDCCH a second repetition of the PDCCH in the second set of REs.

In one embodiment, a radio access node for DCI transmission using multiple TCI states, in a wireless network, comprises processing circuitry configured to cause the radio access node to provide, to a wireless communication device, one or more messages that activate a first TCI state and a second TCI state for a CORESET comprising a first set of REs associated to the first TCI state and a second set of REs associated to the second TCI state. The radio access node is further adapted to send, to the wireless communication device, a configuration of: a SS set associated with the CORESET, one or more ALs, and a plurality of PDCCH candidates comprising PDCCH candidates for each of the one or more ALs in the SS set, wherein each PDCCH candidate comprises REs in the first set of REs and REs in the second set of REs. A DCI is transmitted to the wireless communication device, and the DCI is carried by either: (a) a single PDCCH in one of the plurality of PDCCH candidates that comprises REs in the first set of REs and REs in the second sets of REs or (b) a first repetition of a PDCCH in the first set of REs and a second PDCCH a second repetition of the PDCCH in the second set of REs.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 17 illustrates examples of CCE allocation for PDCCH candidates at a given aggregation level in a search space set associated with a CORESET with (a) one activated TCI state and (b) two activated TCI states, in accordance with one embodiment of the present disclosure;

FIGS. 26, 27, 28, and 29 are flow charts that illustrate example embodiments of methods implemented in a communication system such as that of FIG. 24.

DETAILED DESCRIPTION

Figure 1:
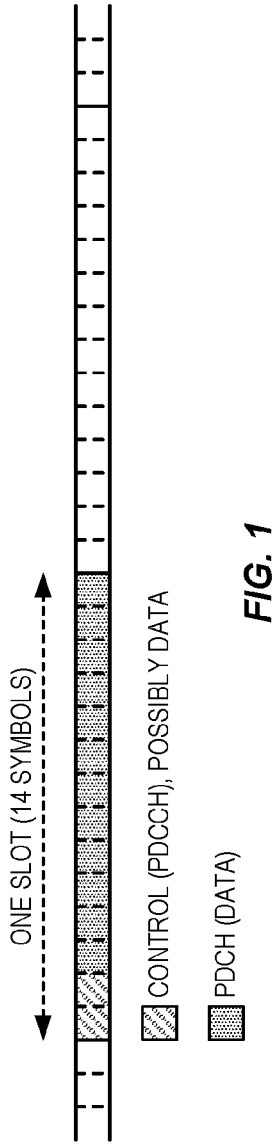
FIG. 1 illustrates an example of a slot Third Generation Partnership Project (3GPP) New Radio (NR)
Figure 2:
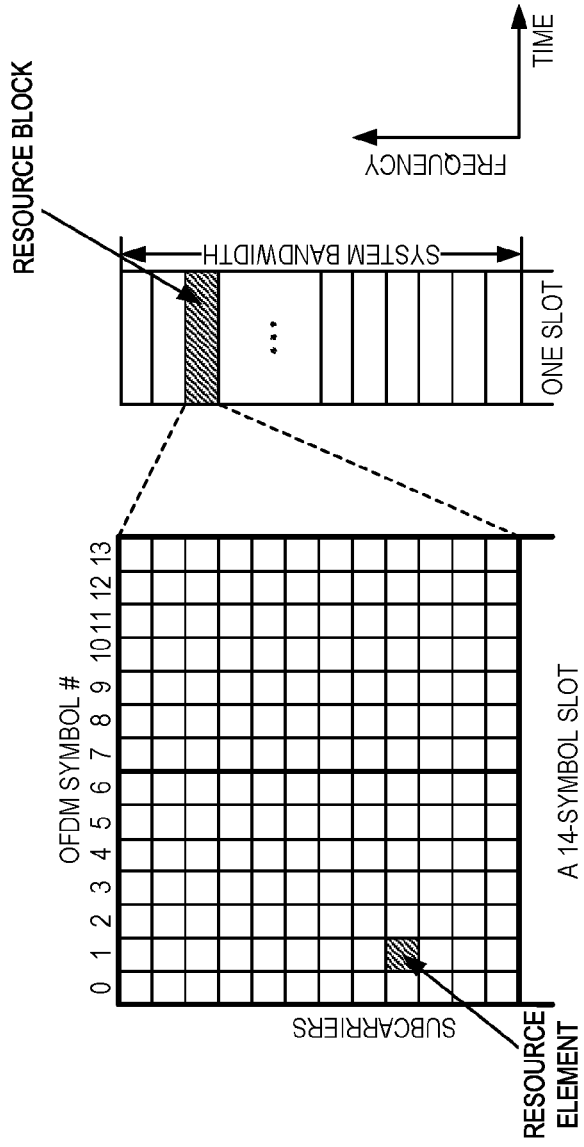
FIG. 2 illustrates the basic NR physical time-frequency resource grid.
Figure 3:
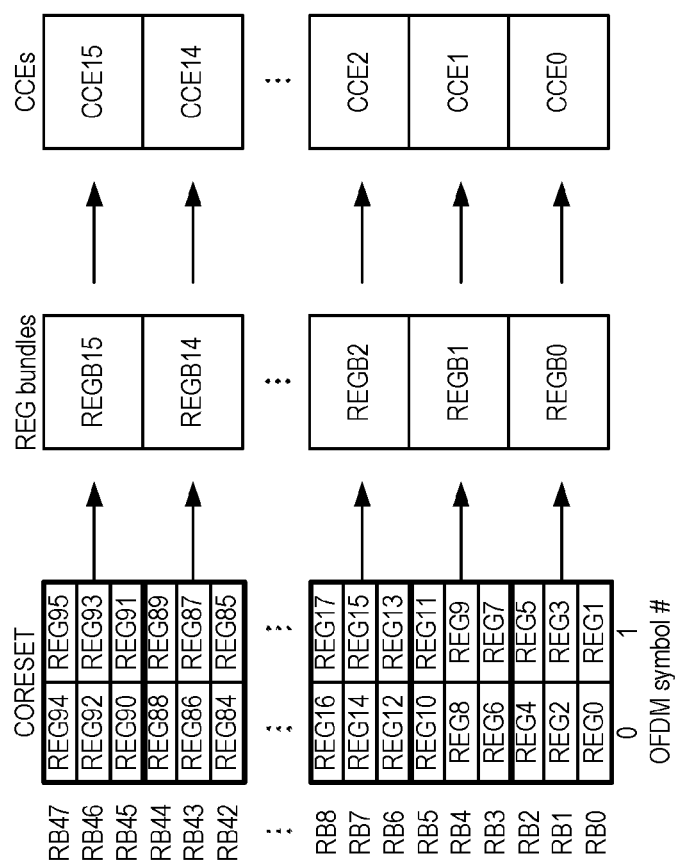
FIG. 3 illustrates an example of non-interleaved Resource Element Group (REG) bundles.
Figure 4:
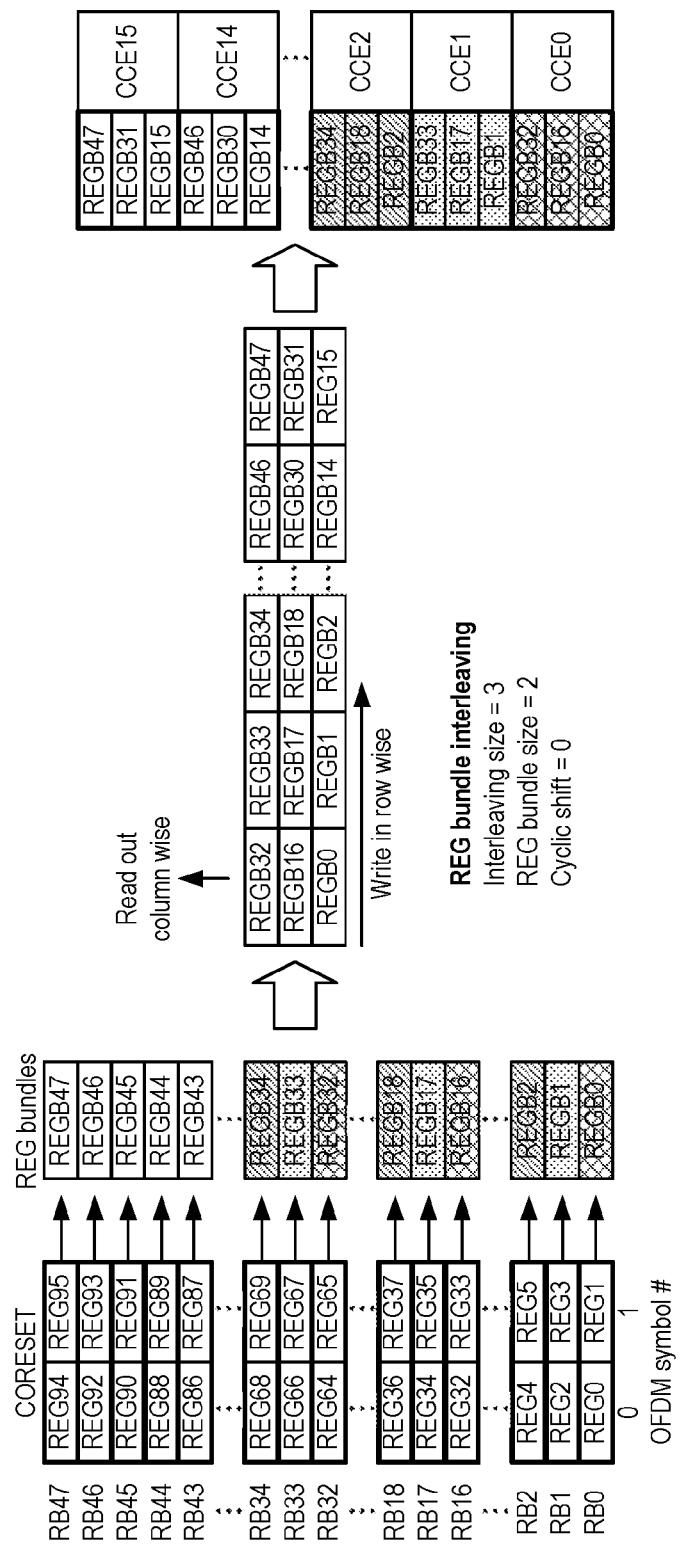
FIG. 4 illustrates an example of interleaved REG bundles.
Figures 5, 6:
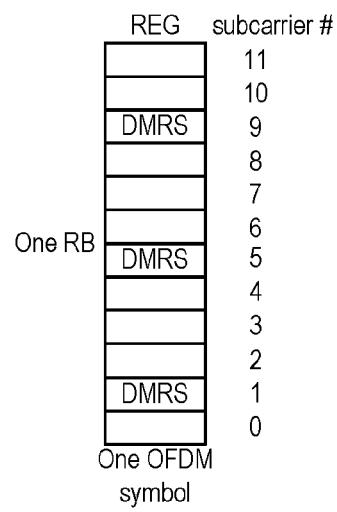
FIG. 5 illustrates Demodulation Reference Signal (DMRS) allocations in each REG.
FIG. 6 illustrates an example of Physical Downlink Control Channel (PDCCH) candidate to Control Channel Element (CCE) mapping for different Aggregation Levels (ALs)
Figure 7:
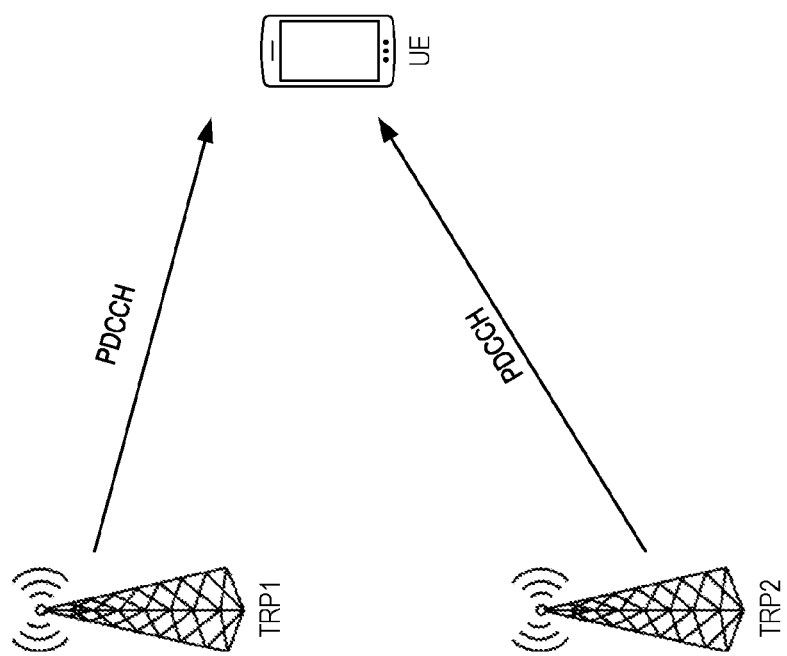
FIG. 7 illustrates PDCCH enhancements with multiple Transmission/Reception Points (TRPs) proposed in NR Release 17.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states. In some embodiments, a TRP may a part of the gNB transmitting and receiving radio signals to/from UE according to physical layer properties and parameters inherent to that element. In some embodiments, in Multiple TRP (multi-TRP) operation, a serving cell can schedule UE from two TRPs, providing better Physical Downlink Shared Channel (PDSCH) coverage, reliability and/or data rates. There are two different operation modes for multi-TRP: single Downlink Control Information (DCI) and multi-DCI. For both modes, control of uplink and downlink operation is done by both physical layer and Medium Access Control (MAC). In single-DCI mode, UE is scheduled by the same DCI for both TRPs and in multi-DCI mode, UE is scheduled by independent DCIs from each TRP.

In some embodiments, a set Transmission Points (TPs) is a set of geographically co-located transmit antennas (e.g., an antenna array (with one or more antenna elements)) for one cell, part of one cell or one Positioning Reference Signal (PRS)-only TP. TPs can include base station (eNB) antennas, Remote Radio Heads (RRHs), a remote antenna of a base station, an antenna of a PRS-only TP, etc. One cell can be formed by one or multiple TPs. For a homogeneous deployment, each TP may correspond to one cell.

In some embodiments, a set of TRPs is a set of geographically co-located antennas (e.g., an antenna array (with one or more antenna elements)) supporting TP and/or Reception Point (RP) functionality.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s) with respect Physical Downlink Control Channel (PDCCH) enhancement with multiple TRPs. In particular, the following problems are identified for the existing solutions:
1. For PDCCH repetition with soft combining, one issue is how to let a UE know which two PDCCH candidates in two Control Resource Sets (CORESETs) carry the same Downlink Control Information (DCI) and thus can be soft combined.
2. For PDCCH repetition with or without soft combining, another issue is how to define the time offset between the reception of a downlink (DL) DCI and the corresponding Physical Downlink Shared Channel (PDSCH) in case of PDCCH repetition. Since there may be more than one PDCCH received with the same DCI but in different Orthogonal Frequency Division Multiplexing (OFDM) symbols. The offset is used to compare with a threshold and, depending on whether the offset exceeds the threshold, different assumptions are made on the Transmission Configuration Indicator (TCI) state(s) for the PDSCH reception.
3. When a PUCCH resource set with more than eight PUCCH resources is selected for Hybrid Automatic Repeat Request (HARQ) Acknowledgement/Negative Acknowledgement (A/N) feedback for a PDSCH scheduled by a DCI, PUCCH Resource Indicator (PRI) in the DCI and the index of a first Control Channel Element (CCE) over which the DCI is detected are used for identifying a PUCCH resource for the HARQ A/N. In case of PDCCH repetition, the first CCE for each of the multiple PDCCH transmission occasions in different CORESETs can be different. Thus, depending on which PDCCH occasion is decoded successfully, different PUCCH resources would be selected by a UE. Since the gNB does not know in which of the PDCCH occasions the PDCCH may be decoded successfully, the gNB would need to blind decode in two or more PUCCH resources. This increases gNB complexity, which is a problem. If all PDCCH occasions were decoded successfully, which PUCCH resource the UE should use would be an issue for the UE.
4. The same PUCCH resource determination issue also exists with the solution of CCE interleaving over two CORESETs, where which of the two CORESETs to use is an issue.
5. For PDCCH repetition where two or more PDCCHs are transmitted, another issue is related to PDSCH rate matching. When a PDSCH overlaps with the PDCCH scheduling the PDSCH, the UE assumes that the scheduled PDSCH is rate-matched around the PDCCH scheduling the PDSCH, i.e., the PDCCH resource is not available for the PDSCH. If there are multiple PDCCHs for a same DCI scheduling the same PDSCH, how to perform the rate matching is a problem.

Certain aspects of the present disclosure and their embodiments may provide solutions to the aforementioned or other challenges. In one embodiment, a method is provided where the method comprises activating $N_{TCI}>1$ TCI states for a CORESET where each of the TCI states is associated with a unique Quasi Co-Located (QCL) source reference signal (RS) and, hence, a different TRP or a different transmit beam. The Resource Element Groups (REGs) (or REG bundles, or CCEs) in the CORESET (or in a PDCCH candidate) are divided into $N_{TCI}$ subsets of REGs (or REG bundles, or CCEs), where each subset is associated with one of the activated TCI states.

The mapping of a REG to a subset of REGs can be based on:
(a) the index of the REG,
(b) the OFDM symbol in which the REG is located,
(c) the REG location within a REG bundle,
(d) the REG bundle or the CCE the REG belongs to,
(e) the CORESET configuration on precoding granularity,
(f) the CCE to REG mapping,
(g) number of OFDM symbols; or
(h) a combination of two or more of (a)-(g).

In case the mapping is in granularity of REGs or REG bundles, each CCE in the CORESET may be associated with $N_{TCI}$ TCI states.

A PDCCH in each subset of REGs (or REG bundles, or CCEs) in the corresponding PDCCH candidate resources is transmitted with the TCI state associated with the subset, i.e., the PDCCH in different subsets of REGs (or REG bundles, or CCEs) are transmitted from different TRPs.

Alternatively, a PDCCH may be repeated in the $N_{TCI}$ subsets of REGs of the corresponding CCEs.

Certain embodiments may provide one or more of the following technical advantage(s). In some embodiments, with a single CORESET activated with multiple TCI states, minimal changes to the 3GPP specification are required to support PDCCH diversity over multiple TRPs. Embodiments of aspects of the present disclosure provide a simple way to link resources of two or more PDCCH repetitions in a search space set associated with the CORESET. In embodiments in which a single CORESET is used, a unique PUCCH resource can be determined in case there are more than eight resources in a PUCCH resource set. Embodiments of the present disclosure also enable a UE to determine a unique time offset between a detected PDCCH and its scheduled PDSCH or PUSCH in case of PDCCH repetition regardless of where the PDCCH is successfully decoded.

Figure 8:
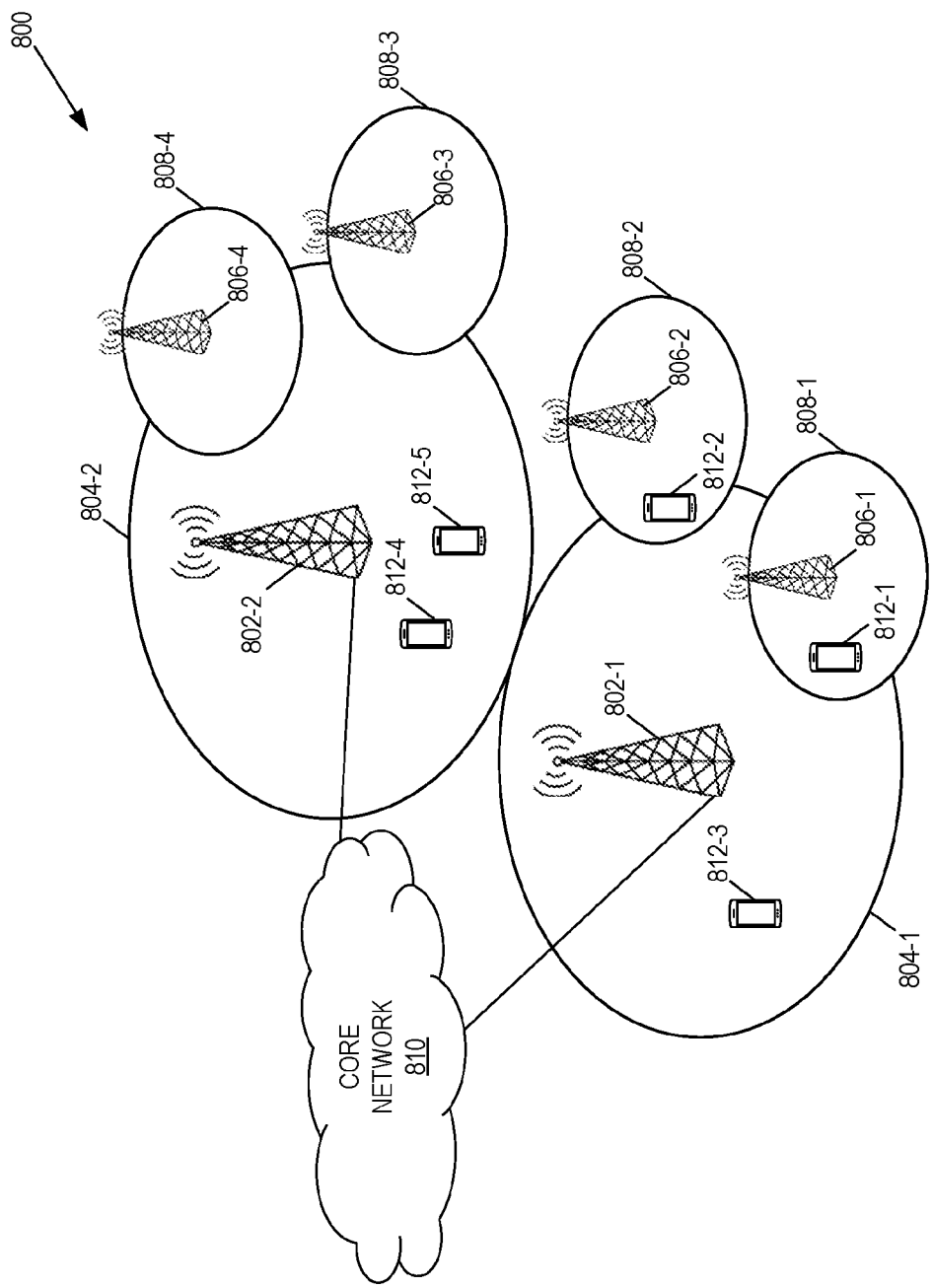
FIG. 8 illustrates one example of a cellular communications system in which embodiments of the present disclosure may be implemented.

FIG. 8 illustrates one example of a cellular communications system 800 in which embodiments of the present disclosure may be implemented. In the embodiments described herein, the cellular communications system 800 is a 5G system (5GS) including a Next Generation RAN (NG-RAN) and a 5G Core (5GC); however, the solutions disclosed herein are not limited thereto. In this example, the RAN includes radio access nodes 802-1 and 802-2 (e.g., base stations), which in the 5GS include NR base stations (gNBs) and optionally next generation eNBs (ng-eNBs) (e.g., LTE RAN nodes connected to the 5GC), controlling corresponding (macro) cells 804-1 and 804-2. The radio access nodes 802-1 and 802-2 are generally referred to herein collectively as radio access nodes 802 and individually as radio access node 802. Likewise, the (macro) cells 804-1 and 804-2 are generally referred to herein collectively as (macro) cells 804 and individually as (macro) cell 804. The RAN may also include a number of (low power) radio access nodes 806-1 through 806-4 controlling corresponding small cells 808-1 through 808-4. The radio access nodes 806-1 through 806-4 can be, e.g., small base stations (such as pico or femto base stations) or Remote Radio Heads (RRHs), or the like. Notably, while not illustrated, one or more of the small cells 808-1 through 808-4 may alternatively be provided by the radio access nodes 802. The radio access nodes 806-1 through 806-4 are generally referred to herein collectively as radio access nodes 806 and individually as radio access node 806. Likewise, the small cells 808-1 through 808-4 are generally referred to herein collectively as small cells 808 and individually as small cell 808. The cellular communications system 800 also includes a core network 810, which in the 5GS is referred to as the 5GC. The base stations 802 (and optionally the low power nodes 806) are connected to the core network 810.

The radio access nodes 802 and 806 provide service to wireless communication devices 812-1 through 812-5 in the corresponding cells 804 and 808. The wireless communication devices 812-1 through 812-5 are generally referred to herein collectively as wireless communication devices 812 and individually as wireless communication device 812. In the following description, the wireless communication devices 812 are oftentimes UEs and as such are sometimes referred to herein as UEs 812, but the present disclosure is not limited thereto.

Now, a description of some example embodiments of the present disclosure is provided.

1 REG to TCI State Association in a CORESET Activated with Multiple TCI States

In this embodiment, a CORESET is activated with $N_{TCI}>1$ TCI states, i.e., {TCI state $k_0$, ..., TCI state $k_{N_{TCI}-1}$}, and each of the $N_{TCI}$ activated TCI states is mapped to a different subset of REGs in the CORESET (or in each PDCCH candidate in the CORESET). The $N_{TCI}$ different subsets of the REGs in the CORESET are non-overlapping and may be in different OFDM symbols, different REGs in each REG bundle, or different CCEs. Each PDCCH candidate in a search space associated with the CORESET contains REs in in each of the $N_{TCI}$ subsets of REGs.

For a CORESET activated with $N_{TCI}>1$ TCI states, a UE 812 assumes that the DM-RS antenna port associated with PDCCH reception in the REGs associated with one of the $N_{TCI}$ TCI states in the CORESET is quasi co-located with the one or more DL RSs configured by the TCI state.

1.1 REG Based TCI State Association or Mapping

Figure 9:
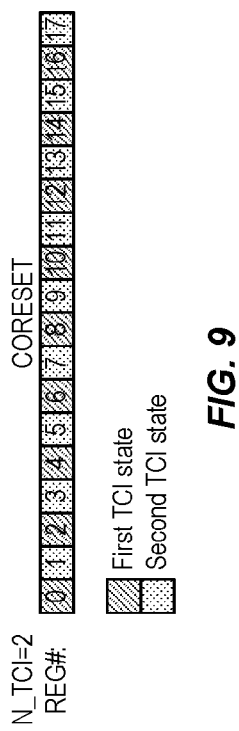
FIG. 9 illustrates an example of REG based Transmission Configuration Indication (TCI) association or mapping in a Control Resource Set (CORESET) activated with multiple TCI states, in accordance with one embodiment of the present disclosure.

In this embodiment, the $i^{th}$ (i=0, 1, ..., $N_{REG}-1$) REG in the CORESET is associated with TCI state $k_s$ (0≤s<$N_{TCI}-1$) with s=(i)mod($N_{TCI}$), where "mod" is a modulo function with i=$N_{TCI}$q+s and q is an integer. An example is shown in FIG. 9, where $N_{TCI}=2$ and $N_{REG}=18$. A first subset of REGs consists of even numbered REGs (i.e., REGs 0, 2, 4, 6, 8, 10, 12, 14, 16) and is mapped to TCI state $k_0$ (the first TCI state), and a second subset of REGs consists of odd numbered REGs (i.e., REGs 1, 3, 5, 7, 9, 11, 13, 15, 17) and is mapped to TCI state $k_1$ (the second TCI state).

With the above REG to TCI state mapping, depending on the number of OFDM symbols configured for the CORESET, REGs in each OFDM symbol may be associated with one TCI state or two TCI states.

Figure 10:
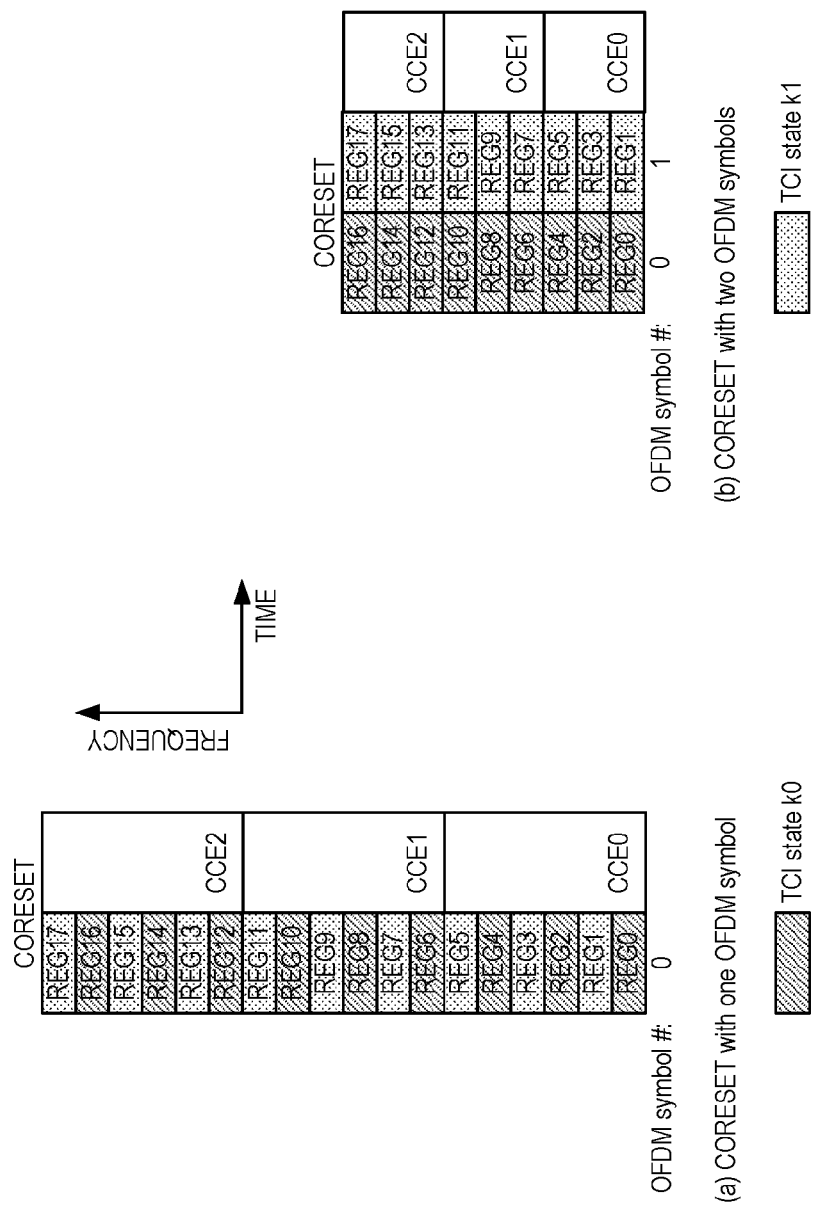
FIG. 10 illustrates examples of REG to TCI association for (a) a CORESET with one Orthogonal Frequency Division Multiplexing (OFDM) symbol and (b) a CORESET with two OFDM symbols, in accordance with embodiments of the present disclosure.

An example is shown in FIG. 10. FIG. 10(a) shows a case where the CORESET consists of one OFDM symbol with non-interleaved CCE to REG mapping. In this case, the OFDM symbol is associated to two TCI states. This may be used in FR1 or in FR2 where a UE 812 is able to receive from two TRPs simultaneously. A PDCCH is transmitted simultaneously from the two TRPs in different REGs. In other words, the UE 812 receives a PDCCH such that REGs associated with two different TCI states are simultaneously received.

FIG. 10(b) shows a case where the CORESET consists of two OFDM symbols. In this case, each OFDM symbol is associated with one TCI state. A PDCCH is transmitted in the first symbol from the first TRP (associated with a first TCI state) and in the second symbol from the second TRP (associated with a second TCI state). This is suitable for FR2 where a UE 812 can receive from only one TRP at a time.

1.2 REG Bundle Based TCI State Association or Mapping

Figure 11:
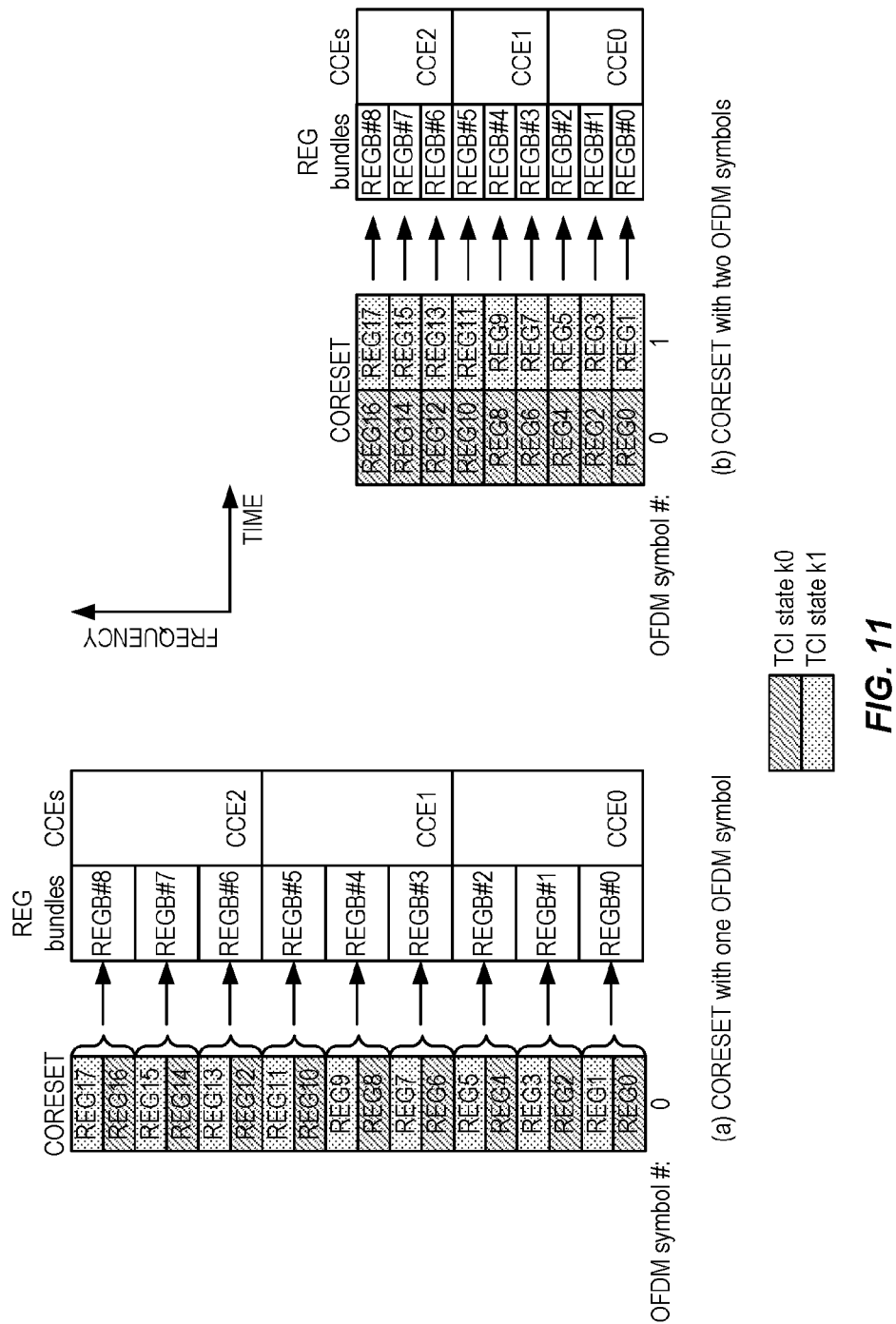
FIG. 11 illustrates examples of REG bundle based TCI state association with REG bundle size of two REGs for (a) a CORESET with one OFDM symbol and (b) a CORESET with two OFDM symbols, in accordance with embodiments of the present disclosure.

In this embodiment, REGs in each REG bundle are divided into $N_{TCI}$ subsets, each associated with one of the $N_{TCI}$ TCI states. In one example, the $i^{th}$ (i=0, 1, ..., $N_{REG}^{Bundle}-1$) REG in each REG bundle in the CORESET is associated with TCI state $k_s$ (0≤s<$N_{TCI}-1$) with s=(i)mod ($N_{TCI}$), where $N_{REG}^{Bundle}$ is the REG bundle size. An example with $N_{REG}^{Bundle}=N_{TCI}=2$ is shown in FIG. 11 with the same CORESET as shown in FIG. 10. FIG. 11 illustrates an example of REG bundle based TCI state association with REG bundle size of 2 REGs, (a) CORESET with one OFDM symbol; (b) CORESET with two OFDM symbols.

In another embodiment, if the CORESET is in one OFDM symbol and $N_{REG}^{Bundle}=kN_{TCI}$ (k is an integer), the first k REGs in each REG bundle are associated with the first TCI state, the second k REGs in each REG bundle are associated with the second TCI state, and so on. An example is shown in FIG. 12(a), where $N_{TCI}=2$ and $N_{REG}^{Bundle}=6=3 N_{TCI}$. This would allow channel interpolation over a group of REGs in each REG bundle from each TRP, e.g., REGs 0, 1, and 2 associated to the first TCI state, to improve channel estimation performance.

If the CORESET is in two OFDM symbols, the REGs of each REG bundle in the first OFDM symbols are associated with the first TCI state and the REGs of each REG bundle in the second OFDM symbol are associated with the second TCI state. An example is shown in FIG. 12(b), where $N_{TCI}=2$ and $N_{REG}^{Bundle}=6=3 N_{TCI}$.

If $N_{REG}^{Bundle} > N_{TCI}$ and $$\frac{N_{REG}^{Bundle}}{N_{TCI}}$$

is not an integer (tor example $N_{REG}^{Bundle}=3$ and $N_{TCI}=2$), then REGs in the first $$\left\lceil \frac{N_{REG}^{Bundle}}{N_{TCI}} \right\rceil \left( \text{or} \left\lfloor \frac{N_{REG}^{Bundle}}{N_{TCI}} \right\rfloor \right)$$

OFDM symbol(s) in each REG bundle may be associated with the first TCI state, the remaining REGs in the remaining $$N_{REG}^{Bundle} - \left\lceil \frac{N_{REG}^{Bundle}}{N_{TCI}} \right\rceil \left( \text{or } N_{REG}^{Bundle} - \left\lfloor \frac{N_{REG}^{Bundle}}{N_{TCI}} \right\rfloor \right)$$

Figure 13:
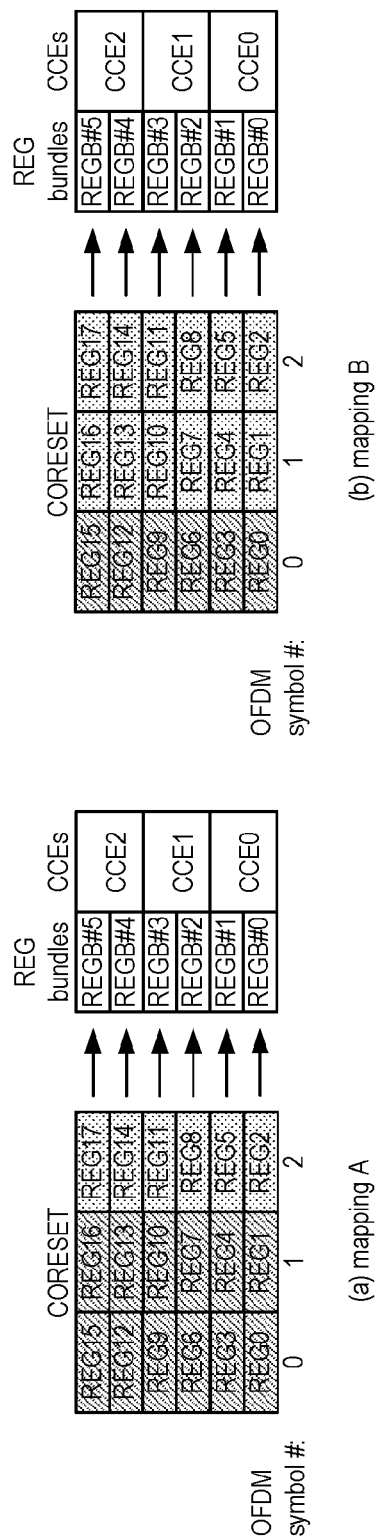
FIG. 13 illustrates examples of REG to TCI state association with two activated TCI states and a REG bundle size of three, where for example (a) REGs in the first two OFDM symbols are mapped to the first TCI state and REGs in the last OFDM symbol are mapped to the second TCI state and for example (b) REGs in the first OFDM symbols are mapped to the first TCI state and REGs in the last two OFDM symbols are mapped to the second TCI state, in accordance with embodiments of the present disclosure.

OFDM symbols are mapped to the remaining $N_{TCI}-1$ TCI states. An example is shown in FIG. 13, where the CORESET is configured with 3 OFDM symbols and with $N_{TCI}=2$ and $N_{REG}^{Bundle}=3$. FIG. 13 illustrates an example of REG to TCI state association with $N_{TCI}=2$ and $N_{REG}^{Bundle}=3$, (a) REGs in the first 2 OFDM symbols are mapped to the first TCI state and REGs in the last OFDM symbol is mapped to the $2^{nd}$ TCI state; (b) REGs in the first OFDM symbols is mapped to the first TCI state and REGs in the last two OFDM symbols are mapped to the second TCI state.

In a further embodiment, when each CCE in the CORESET contains multiple REG bundles, each REG bundle in a CCE can be mapped to a different TCI state. For example, the $i^{th}$ REG bundle in each CCE may be mapped to a TCI state $k_s$ according to $s=i \text{ Mod}(N_{TCI})$.

Figure 12:
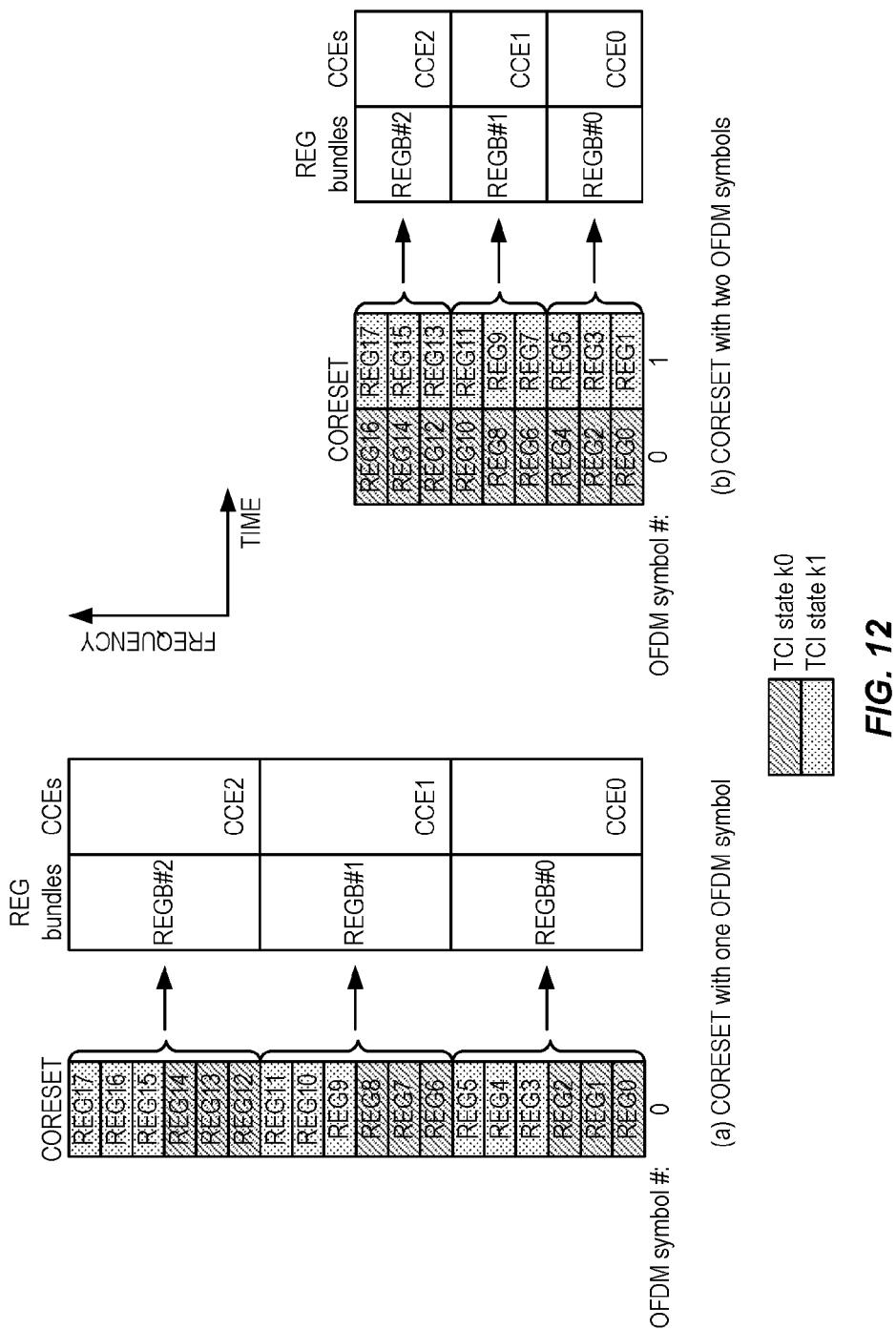
FIG. 12 illustrates examples of REG bundle based TCI state association with REG bundle size of six REGs and with two activated TCI states for (a) a CORESET with one OFDM symbol and (b) a CORESET with two OFDM symbols, in accordance with embodiments of the present disclosure.

The REG to TCI state mapping shown in FIGS. 11 to 13 is good when the precoding granularity of the CORESET is configured with "sameAsREG-bundle" in which estimation can be done jointly in REGs associated with a same TCI state in each REG bundle. In case that more than one OFDM symbol is configured for the CORESET, the TCI association shown in FIG. 11 to FIG. 13 is also good for precoding granularity configured with "allContiguousRBs" and non-interleaving CCE-to-REG mapping (e.g., FIG. 11(b) to FIG. 13(b)).

If the precoding granularity of the CORESET is configured with "allContiguousRBs", channel estimation in consecutive RBs may be done jointly together. In this case, it is desired that consecutive RBs in the CORESET are transmitted from a same TRP. Thus, in another embodiment, when the precoding granularity is configured with "allContiguousRBs" and the CORESET has one OFDM symbol, the REGs in the first subset of consecutive RBs in the CORESET are mapped to a first TCI state, the REGs in the second subset of consecutive RBs are mapped to the second TCI state, and so on. For example, if $N_{TCI}=2$ and the CORESET is configured with $n_{PRB}$ PRBs, then the first $$\left\lceil \frac{n_{PRB}}{2} \right\rceil \left( \text{or} \left\lfloor \frac{n_{PRB}}{2} \right\rfloor \right)$$

PRBs configured for the CORESET can be associated with the first TCI state and the remaining PRBs in the CORESET to the second TCI state.

In yet another embodiment, when the precoding granularity is configured with "allContiguousRBs" and the CORESET has one OFDM symbol, the REGs in the first subset of consecutive RBs in PDCCH candidate in the CORESET is mapped to a first TCI state, the second subset of consecutive PRBs in PDCCH candidate to the second TCI state, and so on.

1.3 CCE Based TCI State Association or Mapping

In some scenarios, a UE 812 may be able to receive signals from multiple TRPs, e.g., in FR1 or in FR2 with multiple receive panels simultaneously. In those scenarios, REG to TCI state mapping can be based on the unit of CCEs. In this embodiment, a CORESET is activated with $N_{TCI}>1$ TCI states, i.e., {TCI state $k_0$, TCI state $k_{N_{TCI}-1}$}, and the $N_{TCI}$ activated TCI states are associated with different sets of CCEs in the CORESET.

Figure 14:
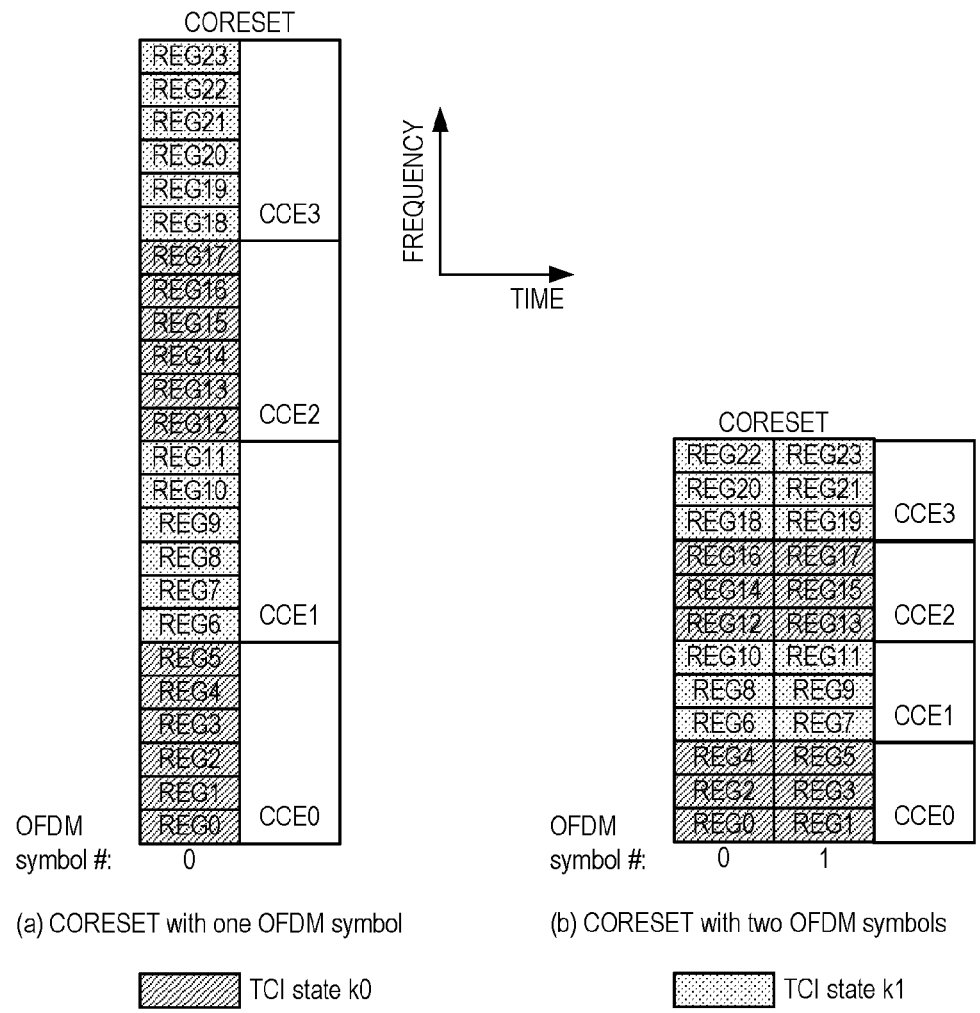
FIG. 14 illustrates examples of CCE to TCI state association for (a) a CORESET with one OFDM symbol and (b) a CORESET with two OFDM symbols, in accordance with embodiments of the present disclosure.

An example embodiment is shown in FIG. 14 for the case where $N_{TCI}=2$ TCI states are activated for a CORESET. FIG. 14(a) shows a case where the CORESET consists of one OFDM symbol with non-interleaved CCE to REG mapping. FIG. 14(b) shows a case where the CORESET consists of 2 OFDM symbols. In both these cases, the even CCEs are associated with a first TCI state (e.g., TCI state $k_0$) and the odd CCEs are associated with a second TCI state (e.g., TCI state $k_1$). Furthermore, in both these cases, each OFDM symbol is associated with both activated TCI states.

The examples in FIG. 14(a) and FIG. 14(b) may be used in FR1 or in FR2 where a UE 812 is able to receive from two TRPs simultaneously. A PDCCH with one of aggregation levels (2, 4, 8, 16) is transmitted simultaneously from two TRPs in different CCEs. In other words, the UE 812 receives a PDCCH such that CCEs associated with two different TCI states are simultaneously received.

For PDCCH reception in the examples of FIG. 14(a) and FIG. 14(b), the UE assumes that the DM-RS antenna port associated with PDCCH receptions in CCEs {0,2} is quasi co-located with the one or more DL RS configured by TCI state $k_0$, while the DM-RS antenna port associated with PDCCH receptions in CCEs {1,3} is quasi co-located with the one or more DL RS configured by TCI state $k_1$.

In another embodiment, in case the precoding granularity of the CORESET is configured with "allContiguousRBs" and/or CCE to REG mapping is configured with "non-interleaved", each TCI state is mapped to consecutive CCEs.

Although the discussions in Section 1 describe TCI state to REG mapping in a CORESET, the same principle also applies to TCI state to REG mapping in each PDCCH candidate.

2 Single PDCCH Transmission in a CORESET with Multiple TCI States

In this embodiment, a single PDCCH with aggregation level L is transmitted over L consecutive CCEs in the CORESET for a DCI. With the REG to TCI state mappings described in section 1, for $N_{TCI}=2$ and L>1, the PDCCH in the first half of the REGs (i.e., the REGs associated with a first TCI state) in the L CCEs is transmitted from the first TRP and the PDCCH in the other half of REGs (i.e., the REGs associated with a second TCI state) is transmitted from the second TRP.

Figure 15:
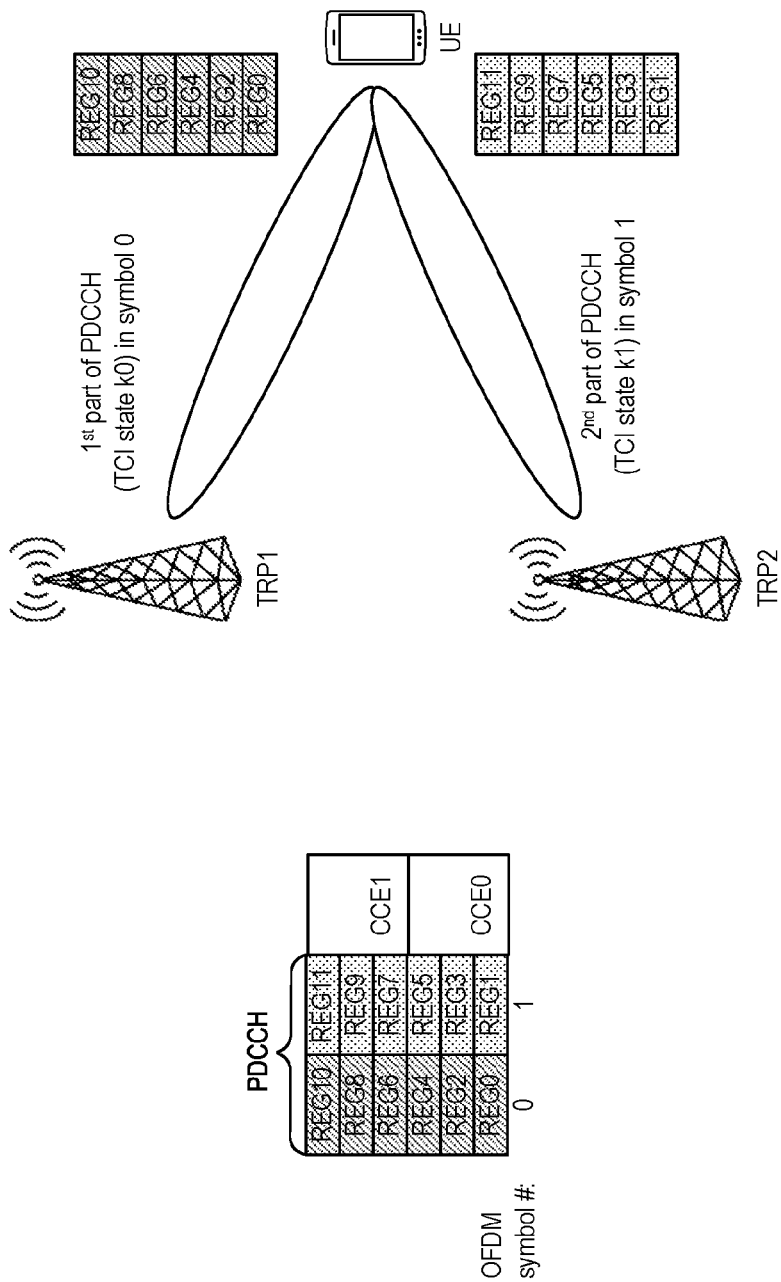
FIG. 15 illustrates an example of a PDCCH with aggregation level L=2 transmitted in a CORESET with two OFDM symbols and activated with two TCI states, where a first part of the PDCCH is transmitted in REGs {0, 2, 4, 6, 8, 10} from TRP1 (i.e., TCI state k0) and a second part of the PDCCH is transmitted in REGs {1, 3, 5, 7, 9, 11} from TRP2 (i.e., TCI state k1), in accordance with one embodiment of the present disclosure.

An example is shown FIG. 15, where a PDCCH with aggregation level L=2 is transmitted in 2 CCEs (i.e., CCEs 0 to 1 in this example) in a CORESET activated with two TCI states. The CORESET is configured with two OFDM symbols. REGs {0,2,4,6,8,10} are associated with a first TCI state (i.e., TCI state k0) and REGs {1,3,5,7,9,11} are associated with a second TCI state (i.e., TCI state k1) according to one of the REG to TCI state mapping methods discussed in section 1. The PDCCH part in REGs {0,2,4,6,8,10} are transmitted from TRP1 (which is associated to TCI state k0) in symbol 0 while the PDCCH part in REGs {1,3,5,7,9,11} are transmitted from TRP2 (which is associated to TCI state k1) in symbol 1. For PDCCH reception, the UE assumes that the DM-RS antenna port associated with PDCCH reception in REGs {0,2,4,6,8,10} is quasi co-located with the one or more DL RS configured by TCI state k0, while the DM-RS antenna port associated with PDCCH receptions in REGs {1,3,5,7,9,11} is quasi co-located with the one or more DL RS configured by TCI state k1.

3 PDCCH Repetition in a CORESET with Multiple TCI States

Figure 16:
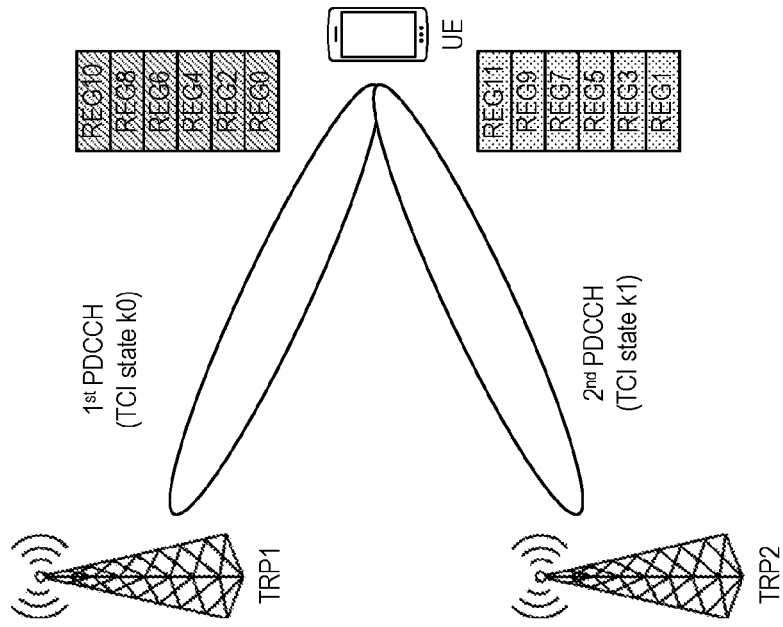
FIG. 16 illustrates an example of PDCCH repetition in a CORESET, where the first PDCCH is the same as the second PDCCH, in accordance with one embodiment of the present disclosure.
Figure 16:
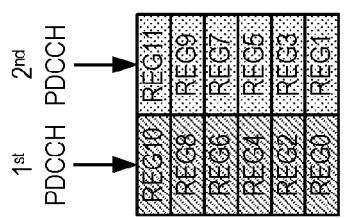

In another embodiment, a PDCCH for a DCI is repeated $N_{TCI}$ times in a CORESET activated with $N_{TCI}$ TCI states. An example is shown in FIG. 16, where the same CORESET with $N_{TCI}=2$ in FIG. 15 is used here. In this example, aggregation level L=2 is configured in a search space set associated with the CORESET. A PDCCH candidate with L=2 is first determined to be in CCE 0 and CCE1 based on the procedures described above in the Section entitled "CORESET and Search Space". Then, a first PDCCH with aggregation level one (i.e., $L/N_{TCI}$) for a DCI is first mapped to REGs associated to the first TCI state (i.e., TCI state k0) in the two CCEs, i.e., REGs {0,2,4,6,8,10}. The same PDCCH is then repeated in the rest of REGs associated to a second TCI state (i.e., TCI state k1), i.e., REGs {1,3,5,7,9,11}. The first PDCCH is transmitted from TRP1 (which is associated with TCI state k0) and the repetition (i.e., the $2^{nd}$ PDCCH) is transmitted from TRP2 (which is associated with TCI state k1). The two PDCCH transmit occasions can be decoded jointly together (e.g., through maximum ratio combining (MRC)) or independently. For PDCCH reception, the UE assumes that the DM-RS antenna port associated with the first PDCCH reception in REGs {0,2,4,6,8,10} is quasi co-located with the one or more DL RS configured by TCI state k0, while the DM-RS antenna port associated with the $2^{nd}$ PDCCH reception in REGs {1,3,5,7,9,11} is quasi co-located with the one or more DL RS configured by TCI state k1.

In one embodiment, the supported aggregation levels in the CORESET with multiple TCI states may be restricted to L>1 for example. This can be done by configuring the allowed ALs to be greater than one in the corresponding search space set associated with the CORESET.

Figure 17:
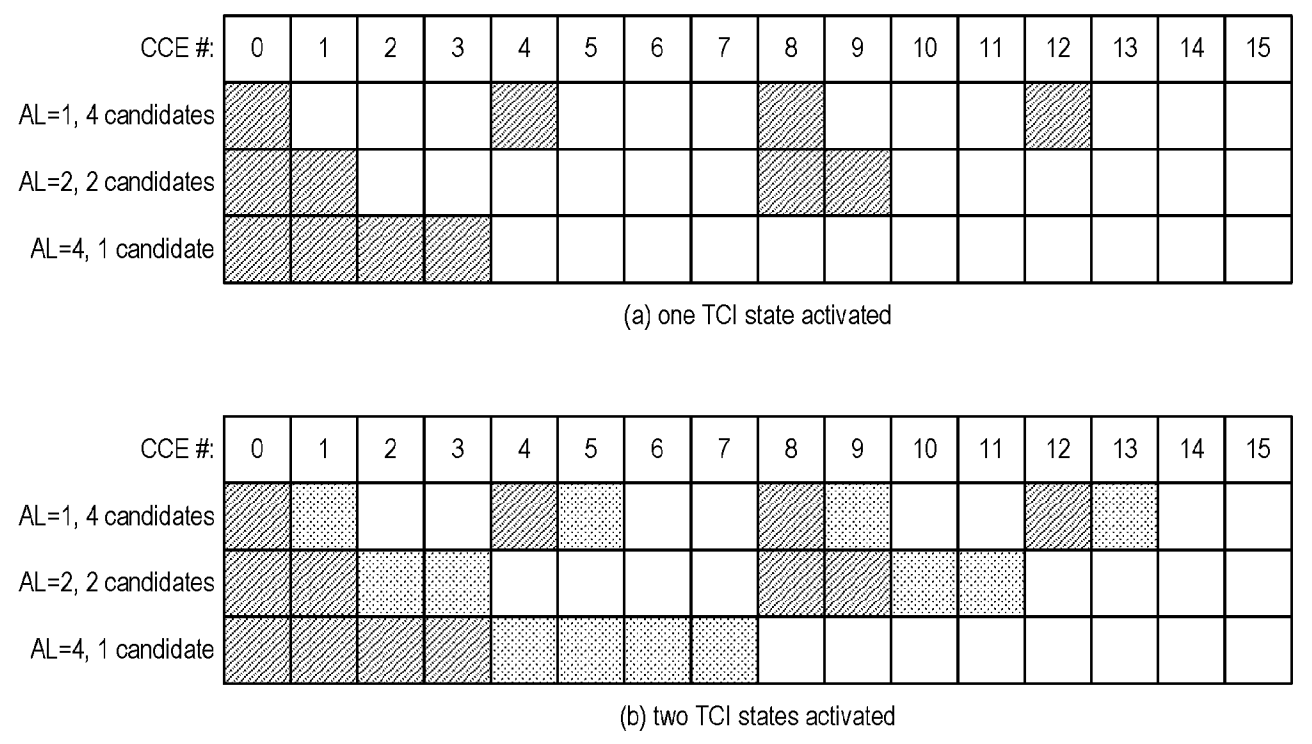

In another embodiment, for a search space set associated with a CORESET activated with $M_{TCI}>1$ TCI states and configured with an aggregation level L, $L \cdot N_{TCI}$ consecutive CCEs are determined. A PDCCH of aggregation level L is repeated $M_{TCI}$ times in the $L \cdot N_{TCI}$ CCEs. An example is shown FIG. 17, where L=1,2,4 are configured in a search space set associated with a CORESET with 16 CCEs. FIG. 17(a) shows the CCE allocations for PDCCH candidates at each aggregation level when $N_{TCI}=1$ TCI state is activated for the CORESET according to existing procedure in NR, where there are L CCEs for each PDCCH candidate of AL=L. FIG. 17(b) shows the CCE allocations for PDCCH candidates at each aggregation level when $N_{TCI}=2$ TCI state is activated, where there are $L \cdot N_{TCI}=2$ L CCEs allocated for each PDCCH candidate of AL=L, according to this embodiment. In this case, a first PDCCH with AL=L is first mapped to REGs associated to the first TCI state in the 2 L CCEs. The same PDCCH is then repeated in the rest of REGs associated to a second TCI state in the 2 L CCEs. For example, for AL=4 and if REG or REG bundle based TCI state mapping is used, a first PDCCH with AL=4 is first mapped to REGs associated to the first TCI state in CCEs 0 to 7. The same PDCCH is then repeated in the rest of REGs associated to a second TCI state. If CCE based TCI state mapping is used, then a first PDCCH with AL=4 is first mapped to REGs associated to the first TCI state in CCEs 0 to 3, The same PDCCH is then repeated in the rest of REGs associated to a second TCI state I CCE 4 to 7.

For a block of complex-valued symbols [d(0), . . . , $d(M_{symb}-1)$] for the first PDCCH in the above example, they are mapped to resource elements (k,l) in REGs used for each of the PDCCH repetitions and not used for the associated PDCCH DMRS in increasing order of first k (i.e., subcarrier index), then l (i.e., OFDM symbol index).

Comparing to the case of single PDCCH transmission shown in FIG. 15, PDCCH repetition in FIG. 16 has some advantage in scenarios where the channel associated with one of the TRPs has a high probability being blocked.

The time offset between the reception of the DCI and the corresponding PDSCH (or PUSCH, aperiodic CSI-RS, SRS, etc.) can be determined as the number of OFDM symbols between the last symbol of the CORESET and the first symbol of the corresponding PDSCH (or PUSCH, aperiodic CSI-RS, SRS, etc.).

When the PDCCH repetitions are over the resource for a single PDCCH candidate (according to existing NR procedure), the number of CCEs for channel estimation are the same, a single blind decoding (BD) can still be considered for decoding the multiple PDCCH repetitions in an existing PDCCH candidate resource. Thus, the same requirement on number of BDs and number of CCEs in a CORESET or a slot in existing NR can be used.

In a further embodiment, the PDSCH rate matching (i.e., resources available for PDSCH to RE mapping) assumes all repetitions, even if the UE 812 does not decode all of them. For example, the first PDCCH is transmitted from TRP1 (first TCI state) and the repetition (i.e., the $2^{nd}$ PDCCH) is transmitted from TRP2 (second TCI state). The UE 812 decodes only the $2^{nd}$ PDCCH successfully, but the PDSCH scheduling in time overlaps with the CORESET. In this case, even if only one PDCCH was detected and used by the UE 812 to obtain the scheduling DCI, the REs occupied by both the first and second PDCCHs are assumed unavailable for the PDSCH. Hence, the UE 812 receives the PDSCH in the REs outside the REs occupied by the first and second PDCCH.

In a further embodiment, the gNB only use one of the two PDCCH repetitions for scheduling the UE 812. The decision to use one or both PDCCH is made in gNB scheduler, based on the need for robustness or based on whether one of the link is believed to be blocked. The gNB can then use the REGs of the unused PDCCH to the UE 812 for scheduling a different PDCCH (e.g., one for a DL DCI and the other for a UL DCI). Note that the UE 812 needs to be aware of this possible switching between using one or two PDCCH (i.e., using one or two TRPs) to the UE 812.

4 on Default TCI State

Another issue that needs to be addressed when two or more TCI states are activated per CORESET is how to define the default TCI state(s) for PDSCH when the offset between the reception of a DL DCI and the corresponding PDSCH is less than a threshold timeDurationForQCL configured by higher layers.

In this embodiment, when TCI state of a CORESET is used as the default TCI state for PDSCH, only one of the activated TCI states per CORESET (e.g., the first activated TCI state) is used for the purpose of defining the default TCI state(s) for PDSCH when the offset between the reception of a DL DCI and the corresponding PDSCH is less than a threshold timeDurationForQCL.

In one example, when the offset between the reception of a DL DCI and the corresponding PDSCH is less than a threshold timeDurationForQCL, the UE 812 may assume that the DM-RS ports of PDSCH of a serving cell are quasi co-located with the RS(s) with respect to the QCL parameter (s) used for PDCCH quasi co-location indication in the first activated TCI state of the CORESET with the lowest CORE-SET-ID in the latest slot in which one or more CORESETs within the active BWP of the serving cell are monitored by the UE.

Default TCI state is also used for UL power control when pathloss RS is not configured or in link monitoring when link monitoring RS is not configured. In these cases, if the CORESET with the lowest CORESET ID of a serving cell is activated with two or more TCI states, the DL RS in one of the TCI states (e.g., the first TCI state) is used as the pathloss RS or the link monitoring RS.

4 Additional Aspects

Figure 18:
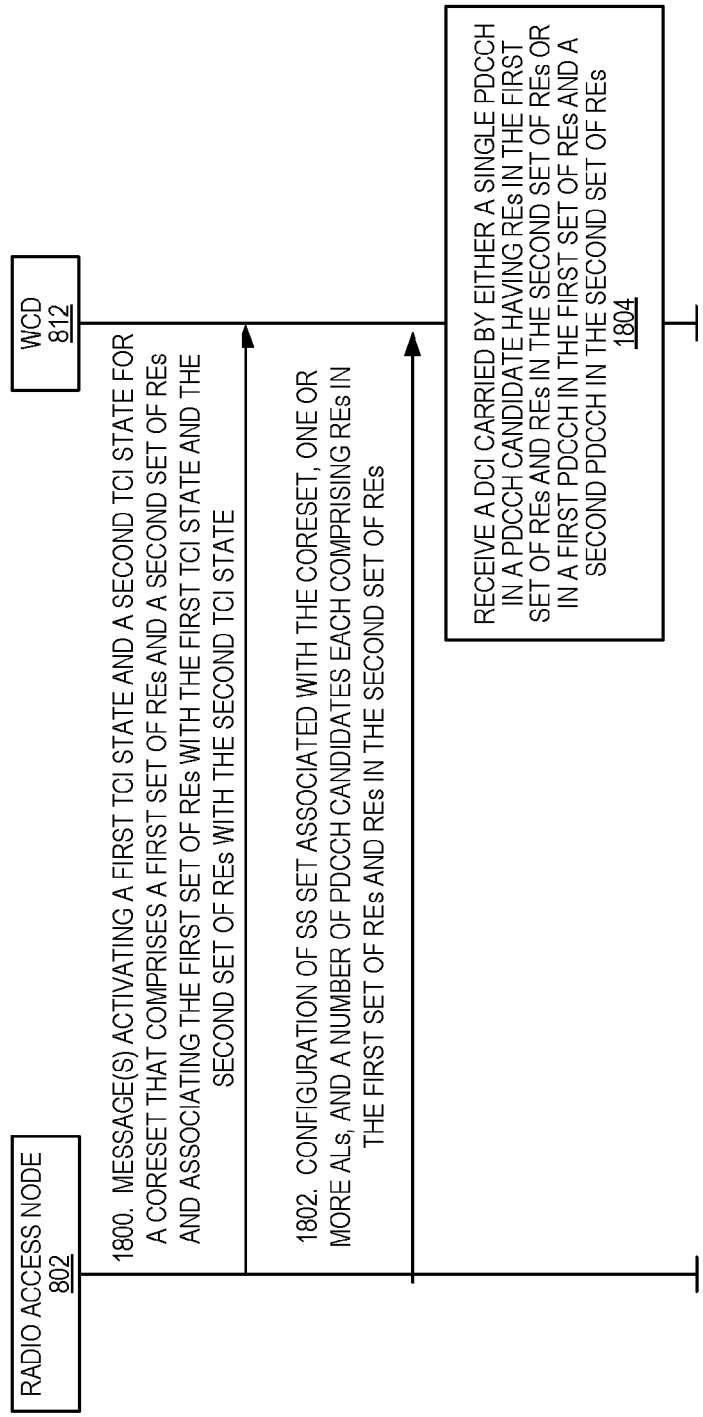
FIG. 18 illustrates the operation of a wireless communication device and a radio access node for Downlink Control Information (DCI) transmission and reception using multiple TCI states in a wireless network in accordance with at least some of the embodiments described herein.

FIG. 18 illustrates the operation of a wireless communication device 812 and a radio access node 802 (or 806) for DCI transmission and reception using multiple TCI states in a wireless network in accordance with at least some of the embodiments described above. As illustrated, the radio access node 802 provides (e.g., sends or transmits), to the wireless communication device 812, one or more messages that activate a first TCI state and a second TCI state for a CORESET comprising a first set of REs associated to the first TCI state and a second set of REs associated to the second TCI state (step 1800). The radio access node 802 also provides, to the wireless communication device 812, a configuration of: a search space (SS) set associated with the CORESET, one or more ALs, and a number of PDCCH candidates for each AL in the SS set (step 1802). Each PDCCH candidate comprises (e.g., consists of) REs in the first set of REs and REs in the second set of REs.

At the wireless communication device 812, the wireless communication device 812 receives the one or more messages that activate the first TCI state and the second TCI state for the CORSET comprising the first set of REs associated to the first TCI state and the second set of REs associated to the second TCI state in step 1800. The wireless communication device 812 also receives the configuration of the SS set associated with the CORESET, the one or more ALs, and the number of PDCCH candidates for each AL in the SS set, in step 1802. The wireless communication device 812 also receives a DCI carried by either: (a) a single PDCCH in one of the number of PDCCH candidates that comprises REs in the first set of REs and REs in the second sets of REs or (b) a first PDCCH (e.g., with an AL of 1) in the first set of REs and a second PDCCH (e.g., with an AL of 1) in the second set of REs (step 1804).

While many details of this procedure are described above, in one embodiment, the CORESET further comprises a number of PRBs in the frequency domain and a number of OFDM symbols in the time domain. In one embodiment, the CORESET further comprises a number of REGs, each consisting of twelve REs in an RB in an OFDM symbol in the CORESET and indexed first in ascending order of OFDM symbols and then in ascending order of RBs starting from the lowest RB in the CORESET. In one embodiment, the CORESET further comprises a number of REG bundles (REGBs), each consisting of a number of consecutive REGs.

In one embodiment, the CORESET further comprises a number of CCEs, each consisting of a number of REGBs.

In one embodiment, the first set of REs and the second set of REs are respectively a first set of REGs and a second set of REGs. In one embodiment, the first set of REGs and the second sets of REGs are interleaved such that the first set of REGs are REGs with even numbered indices and the second set of REGs are REGs with odd numbered indices, or vice versa. In another embodiment, the CORESET further comprises a number of REGBs, each consisting of a number of consecutive REGs, and the first set of REGs consist of a first REG in each of the REGBs and the second set of REGs consist of a second REG in each of the REGBs. In one embodiment, the first REGs and the second REGs in each REGB are REGs in a first OFDM symbol and a second OFDM symbol, respectively. In one embodiment, the first OFDM symbol(s) is different from the second OFDM symbol(s). In one embodiment, the first OFDM symbol is the same as the second OFDM symbol if the number OFDM symbols in the CORESET is one. In another embodiment, the first REGs and the second REGs in each REGB are a first half and a second half of consecutive REGs, respectively.

In another embodiment, the first set of REs and the second sets of REs are respectively a first set of REGBs and a second set of REGBs. In one embodiment, the first set of REGBs are even numbered REGBs and the second set of REGBs are odd numbered REGBs, or vice versa. In another embodiment, the CORESET further comprises a number of CCEs, each consisting of a number of REGBs, and the first set of REGBs and the second set of REGBs are respectively a first REGB and a second REGB in each of the CCEs. In one embodiment, the first REGBs in each of the CCEs and the second REGBs in each of the CCEs are respectively a first half and a second half of consecutive REGBs in each of the CCEs.

In another embodiment, the first set of REs and the second set of REs are respectively a first set of CCEs and a second set of CCEs. In one embodiment, the first set of CCEs are even numbered CCEs and the second set of CCEs are odd numbered CCEs, or vice versa. In another embodiment, the first set of CCEs and the second set of CCEs are respectively a first half and a second half of consecutive CCEs (e.g., in the CORESET).

In one embodiment, the first TCI state and the second TCI state are associated with a first downlink RS and a second downlink RS, respectively.

In one embodiment, each of the PDCCH candidates comprises a number of CCEs. In one embodiment, receiving the DCI in step 1804 comprises receiving the DCI carried by the single PDCCH in the one of the number of PDCCH candidates comprising REs in the first set of REs and REs in the second sets of REs, and further comprises determining the first set of REs and the second sets of REs in a number of CCEs associated with the PDCCH candidate and performing channel estimation based on DMRS in the first set of REs and second set of REs in the CCEs by assuming QCL with a first and the second downlink RS, respectively.

In one embodiment, receiving the DCI in step 1804 comprises receiving the DCI carried by the first PDCCH in the first set of REs and the second PDCCH in the second set of REs, and the first PDCCH is the same as the second PDCCH.

In one embodiment, receiving the DCI in step 1804 comprises receiving the DCI carried by the first PDCCH in the first set of REs and the second PDCCH in the second set of REs, and the first PDCCH and the second PDCCH are received in CCEs associated with one of the PDCCH candidates. In one embodiment, receiving the DCI carried by the first PDCCH in the first set of REs and the second PDCCH in the second set of REs further comprises determining the first set of REs and the second sets of REs in the CCEs and performing channel estimation based DMRS in the first and second sets of REs in the CCEs by assuming quasi co-location with the first or the second downlink RS, respectively.

In one embodiment, receiving the DCI in step 1804 comprises receiving the DCI carried by the first PDCCH in the first set of REs and the second PDCCH in the second set of REs, and the first PDCCH and the second PDCCH are decoded together by combining signals received in the first and the second sets of REs in the CCEs after channel estimation, or separately.

In one embodiment, the method further comprises determining (e.g., at the wireless communication device 812) a time offset between reception of the DCI and a corresponding physical channel or signal as a number of symbols between a last symbol of the CORESET in the SS and a first symbol of the physical channel or signal.

In one embodiment, the CORESET further comprises a number of CCEs, each consisting of a number of REGBs, and the CCEs are not available for PDSCH for the wireless communication device 812.

In one embodiment, the first TCI state and the second TCI state are associated with a first downlink RS and a second downlink RS, respectively, and the method further comprises applying (e.g., at the wireless communication device 812) the first downlink RS as QCL source for PDSCH reception, pathloss RS for uplink power control, or link monitoring RS for link monitoring (e.g., if certain conditions are met and the CORESET has the lowest ID or lowest ID in a slot).

Additional details and embodiments regarding the procedure of FIG. 18 are described in Sections 1, 2, and 3 above and are equally applicable here to the process of FIG. 18.

Figure 19:
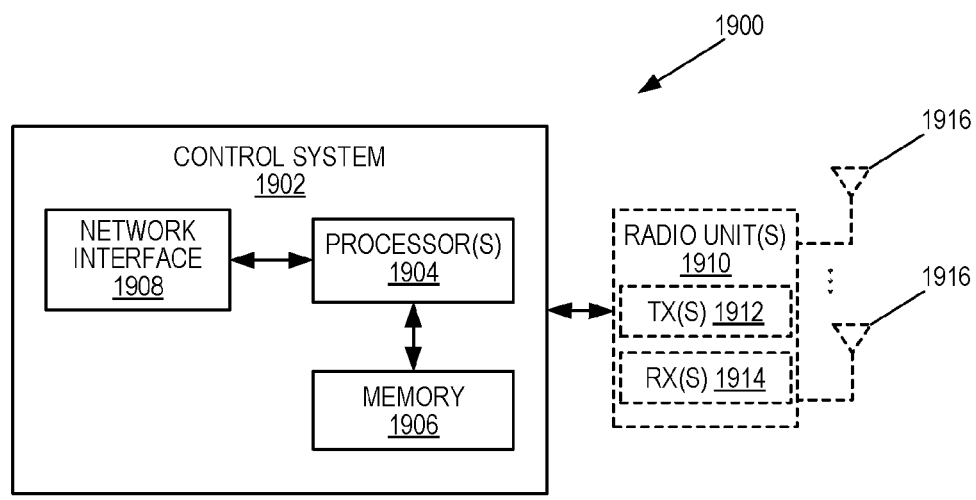
FIGS. 19, 20, and 21 are schematic block diagrams of example embodiments of a radio access node.

FIG. 19 is a schematic block diagram of a radio access node 1900 according to some embodiments of the present disclosure. Optional features are represented by dashed boxes. The radio access node 1900 may be, for example, the radio access node 802 or 806 or a network node that implements all or part of the functionality of a radio access node (e.g., a base station such as, e.g., a gNB) as described herein. As illustrated, the radio access node 1900 includes a control system 1902 that includes one or more processors 1904 (e.g., Central Processing Units (CPUs), Application Specific Integrated Circuits (ASICs), Field Programmable Gate Arrays (FPGAs), and/or the like), memory 1906, and a network interface 1908. The one or more processors 1904 are also referred to herein as processing circuitry. In addition, the radio access node 1900 may include one or more radio units 1910 that each includes one or more transmitters 1912 and one or more receivers 1914 coupled to one or more antennas 1916. The radio units 1910 may be referred to or be part of radio interface circuitry. In some embodiments, the radio unit(s) 1910 is external to the control system 1902 and connected to the control system 1902 via, e.g., a wired connection (e.g., an optical cable). However, in some other embodiments, the radio unit(s) 1910 and potentially the antenna(s) 1916 are integrated together with the control system 1902. The one or more processors 1904 operate to provide one or more functions of the radio access node 1900 as described herein (e.g., one or more functions of a radio access node 802 or 806, a base station, a gNB, or the like, as described herein, e.g., with respect to FIG. 18). In some embodiments, the function(s) are implemented in software that is stored, e.g., in the memory 1906 and executed by the one or more processors 1904.

Figure 20:
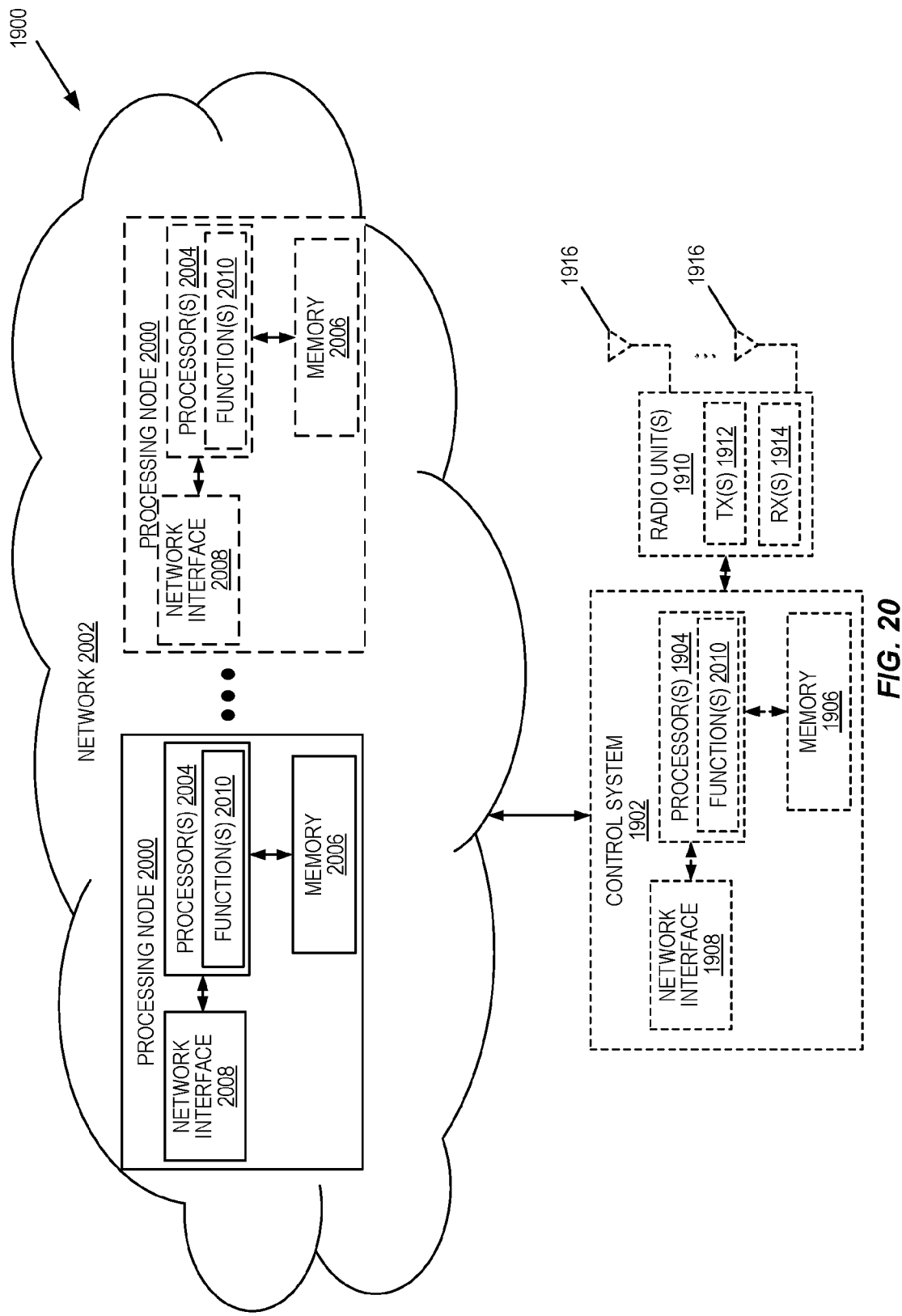

FIG. 20 is a schematic block diagram that illustrates a virtualized embodiment of the radio access node 1900 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1900 in which at least a portion of the functionality of the radio access node 1900 is implemented as a virtual component(s) (e.g., via a virtual machine(s) executing on a physical processing node(s) in a network(s)). As illustrated, in this example, the radio access node 1900 may include the control system 1902 and/or the one or more radio units 1910, as described above. The control system 1902 may be connected to the radio unit(s) 1910 via, for example, an optical cable or the like. The radio access node 1900 includes one or more processing nodes 2000 coupled to or included as part of a network(s) 2002. If present, the control system 1902 or the radio unit(s) are connected to the processing node(s) 2000 via the network 2002. Each processing node 2000 includes one or more processors 2004 (e.g., CPUs, ASICs, FPGAs, and/or the like), memory 2006, and a network interface 2008.

In this example, functions 2010 of the radio access node 1900 described herein (e.g., one or more functions of a radio access node 802 or 806, a base station, a gNB, or the like, as described herein, e.g., with respect to FIG. 18) are implemented at the one or more processing nodes 2000 or distributed across the one or more processing nodes 2000 and the control system 1902 and/or the radio unit(s) 1910 in any desired manner. In some particular embodiments, some or all of the functions 2010 of the radio access node 1900 described herein are implemented as virtual components executed by one or more virtual machines implemented in a virtual environment(s) hosted by the processing node(s) 2000. As will be appreciated by one of ordinary skill in the art, additional signaling or communication between the processing node(s) 2000 and the control system 1902 is used in order to carry out at least some of the desired functions 2010. Notably, in some embodiments, the control system 1902 may not be included, in which case the radio unit(s) 1910 communicate directly with the processing node(s) 2000 via an appropriate network interface(s).

In some embodiments, a computer program including instructions which, when executed by at least one processor, causes the at least one processor to carry out the functionality of radio access node 1900 or a node (e.g., a processing node 2000) implementing one or more of the functions 2010 of the radio access node 1900 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 21:
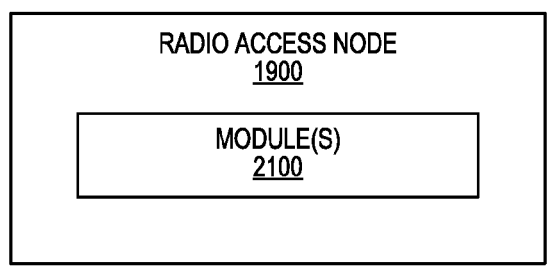

FIG. 21 is a schematic block diagram of the radio access node 1900 according to some other embodiments of the present disclosure. The radio access node 1900 includes one or more modules 2100, each of which is implemented in software. The module(s) 2100 provide the functionality of the radio access node 1900 described herein (e.g., one or more functions of a radio access node 802 or 806, a base station, a gNB, or the like, as described herein, e.g., with respect to FIG. 18). This discussion is equally applicable to the processing node 2000 of FIG. 20 where the modules 2100 may be implemented at one of the processing nodes 2000 or distributed across multiple processing nodes 2000 and/or distributed across the processing node(s) 2000 and the control system 1902.

Figure 22:
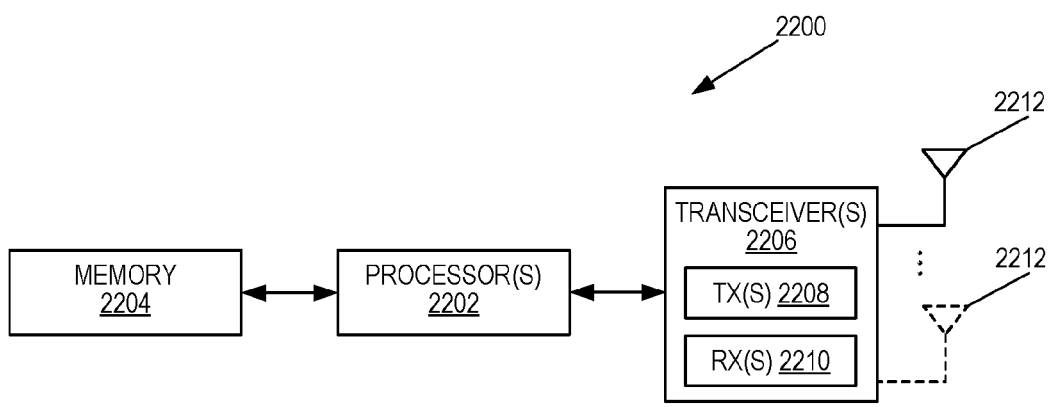
FIGS. 22 and 23 are schematic block diagrams of example embodiments of a wireless communication device.

FIG. 22 is a schematic block diagram of a wireless communication device 2200 according to some embodiments of the present disclosure. As illustrated, the wireless communication device 2200 includes one or more processors 2202 (e.g., CPUs, ASICs, FPGAs, and/or the like), memory 2204, and one or more transceivers 2206 each including one or more transmitters 2208 and one or more receivers 2210 coupled to one or more antennas 2212. The transceiver(s) 2206 includes radio-front end circuitry connected to the antenna(s) 2212 that is configured to condition signals communicated between the antenna(s) 2212 and the processor(s) 2202, as will be appreciated by on of ordinary skill in the art. The processors 2202 are also referred to herein as processing circuitry. The transceivers 2206 are also referred to herein as radio circuitry. In some embodiments, the functionality of the wireless communication device 2200 described above (e.g., one or more functions of a wireless communication device 812, UE, or the like, as described herein, e.g., with respect to FIG. 18) may be fully or partially implemented in software that is, e.g., stored in the memory 2204 and executed by the processor(s) 2202. Note that the wireless communication device 2200 may include additional components not illustrated in FIG. 22 such as, e.g., one or more user interface components (e.g., an input/output interface including a display, buttons, a touch screen, a microphone, a speaker(s), and/or the like and/or any other components for allowing input of information into the wireless communication device 2200 and/or allowing output of information from the wireless communication device 2200), a power supply (e.g., a battery and associated power circuitry), etc.

In some embodiments, a computer program including instructions which, when executed by at least one processor, causes the at least one processor to carry out the functionality of the wireless communication device 2200 according to any of the embodiments described herein (e.g., one or more functions of a wireless communication device 812, UE, or the like, as described herein, e.g., with respect to FIG. 18) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 23:
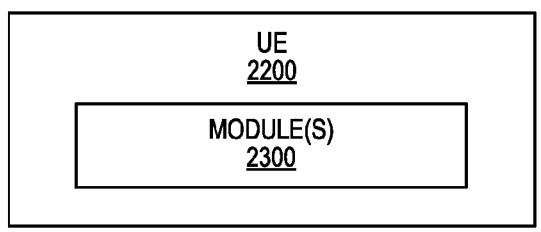

FIG. 23 is a schematic block diagram of the wireless communication device 2200 according to some other embodiments of the present disclosure. The wireless communication device 2200 includes one or more modules 2300, each of which is implemented in software. The module(s) 2300 provide the functionality of the wireless communication device 2200 described herein (e.g., one or more functions of a wireless communication device 812, UE, or the like, as described herein, e.g., with respect to FIG. 18).

Figure 24:
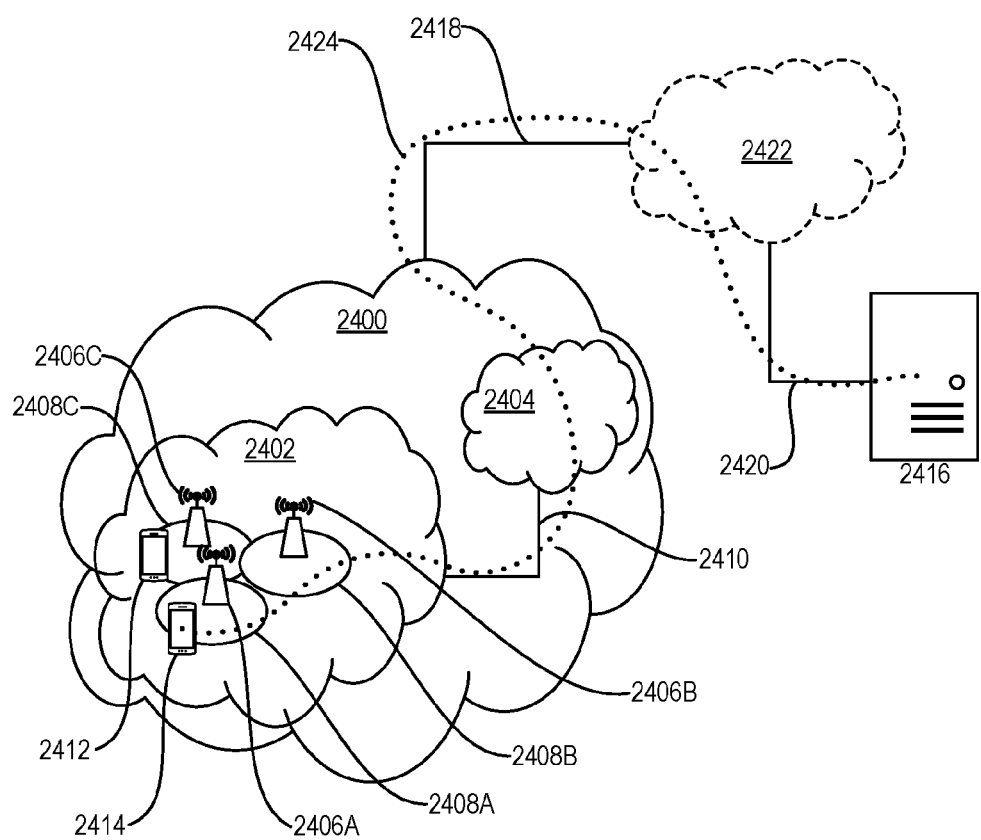
FIG. 24 illustrates an example embodiment of a communication system in which embodiments of the present disclosure may be implemented.

With reference to FIG. 24, in accordance with an embodiment, a communication system includes a telecommunication network 2400, such as a 3GPP-type cellular network, which comprises an access network 2402, such as a RAN, and a core network 2404. The access network 2402 comprises a plurality of base stations 2406A, 2406B, 2406C, such as Node Bs, eNBs, gNBs, or other types of wireless Access Points (APs), each defining a corresponding coverage area 2408A, 2408B, 2408C. Each base station 2406A, 2406B, 2406C is connectable to the core network 2404 over a wired or wireless connection 2410. A first UE 2412 located in coverage area 2408C is configured to wirelessly connect to, or be paged by, the corresponding base station 2406C. A second UE 2414 in coverage area 2408A is wirelessly connectable to the corresponding base station 2406A. While a plurality of UEs 2412, 2414 are illustrated in this example, the disclosed embodiments are equally applicable to a situation where a sole UE is in the coverage area or where a sole UE is connecting to the corresponding base station 2406.

The telecommunication network 2400 is itself connected to a host computer 2416, which may be embodied in the hardware and/or software of a standalone server, a cloud-implemented server, a distributed server, or as processing resources in a server farm. The host computer 2416 may be under the ownership or control of a service provider, or may be operated by the service provider or on behalf of the service provider. Connections 2418 and 2420 between the telecommunication network 2400 and the host computer 2416 may extend directly from the core network 2404 to the host computer 2416 or may go via an optional intermediate network 2422. The intermediate network 2422 may be one of, or a combination of more than one of, a public, private, or hosted network; the intermediate network 2422, if any, may be a backbone network or the Internet; in particular, the intermediate network 2422 may comprise two or more sub-networks (not shown).

The communication system of FIG. 24 as a whole enables connectivity between the connected UEs 2412, 2414 and the host computer 2416. The connectivity may be described as an Over-the-Top (OTT) connection 2424. The host computer 2416 and the connected UEs 2412, 2414 are configured to communicate data and/or signaling via the OTT connection 2424, using the access network 2402, the core network 2404, any intermediate network 2422, and possible further infrastructure (not shown) as intermediaries. The OTT connection 2424 may be transparent in the sense that the participating communication devices through which the OTT connection 2424 passes are unaware of routing of uplink and downlink communications. For example, the base station 2406 may not or need not be informed about the past routing of an incoming downlink communication with data originating from the host computer 2416 to be forwarded (e.g., handed over) to a connected UE 2412. Similarly, the base station 2406 need not be aware of the future routing of an outgoing uplink communication originating from the UE 2412 towards the host computer 2416.

Example implementations, in accordance with an embodiment, of the UE, base station, and host computer discussed in the preceding paragraphs will now be described with reference to FIG. 25. In a communication system 2500, a host computer 2502 comprises hardware 2504 including a communication interface 2506 configured to set up and maintain a wired or wireless connection with an interface of a different communication device of the communication system 2500. The host computer 2502 further comprises processing circuitry 2508, which may have storage and/or processing capabilities. In particular, the processing circuitry 2508 may comprise one or more programmable processors, ASICs, FPGAs, or combinations of these (not shown) adapted to execute instructions. The host computer 2502 further comprises software 2510, which is stored in or accessible by the host computer 2502 and executable by the processing circuitry 2508. The software 2510 includes a host application 2512. The host application 2512 may be operable to provide a service to a remote user, such as a UE 2514 connecting via an OTT connection 2516 terminating at the UE 2514 and the host computer 2502. In providing the service to the remote user, the host application 2512 may provide user data which is transmitted using the OTT connection 2516.

The communication system 2500 further includes a base station 2518 provided in a telecommunication system and comprising hardware 2520 enabling it to communicate with the host computer 2502 and with the UE 2514. The hardware 2520 may include a communication interface 2522 for setting up and maintaining a wired or wireless connection with an interface of a different communication device of the communication system 2500, as well as a radio interface 2524 for setting up and maintaining at least a wireless connection 2526 with the UE 2514 located in a coverage area (not shown in FIG. 25) served by the base station 2518. The communication interface 2522 may be configured to facilitate a connection 2528 to the host computer 2502. The connection 2528 may be direct or it may pass through a core network (not shown in FIG. 25) of the telecommunication system and/or through one or more intermediate networks outside the telecommunication system. In the embodiment shown, the hardware 2520 of the base station 2518 further includes processing circuitry 2530, which may comprise one or more programmable processors, ASICs, FPGAs, or combinations of these (not shown) adapted to execute instructions. The base station 2518 further has software 2532 stored internally or accessible via an external connection.

The communication system 2500 further includes the UE 2514 already referred to. The UE's 2514 hardware 2534 may include a radio interface 2536 configured to set up and maintain a wireless connection 2526 with a base station serving a coverage area in which the UE 2514 is currently located. The hardware 2534 of the UE 2514 further includes processing circuitry 2538, which may comprise one or more programmable processors, ASICs, FPGAs, or combinations of these (not shown) adapted to execute instructions. The UE 2514 further comprises software 2540, which is stored in or accessible by the UE 2514 and executable by the processing circuitry 2538. The software 2540 includes a client application 2542. The client application 2542 may be operable to provide a service to a human or non-human user via the UE 2514, with the support of the host computer 2502. In the host computer 2502, the executing host application 2512 may communicate with the executing client application 2542 via the OTT connection 2516 terminating at the UE 2514 and the host computer 2502. In providing the service to the user, the client application 2542 may receive request data from the host application 2512 and provide user data in response to the request data. The OTT connection 2516 may transfer both the request data and the user data. The client application 2542 may interact with the user to generate the user data that it provides.

Figure 25:
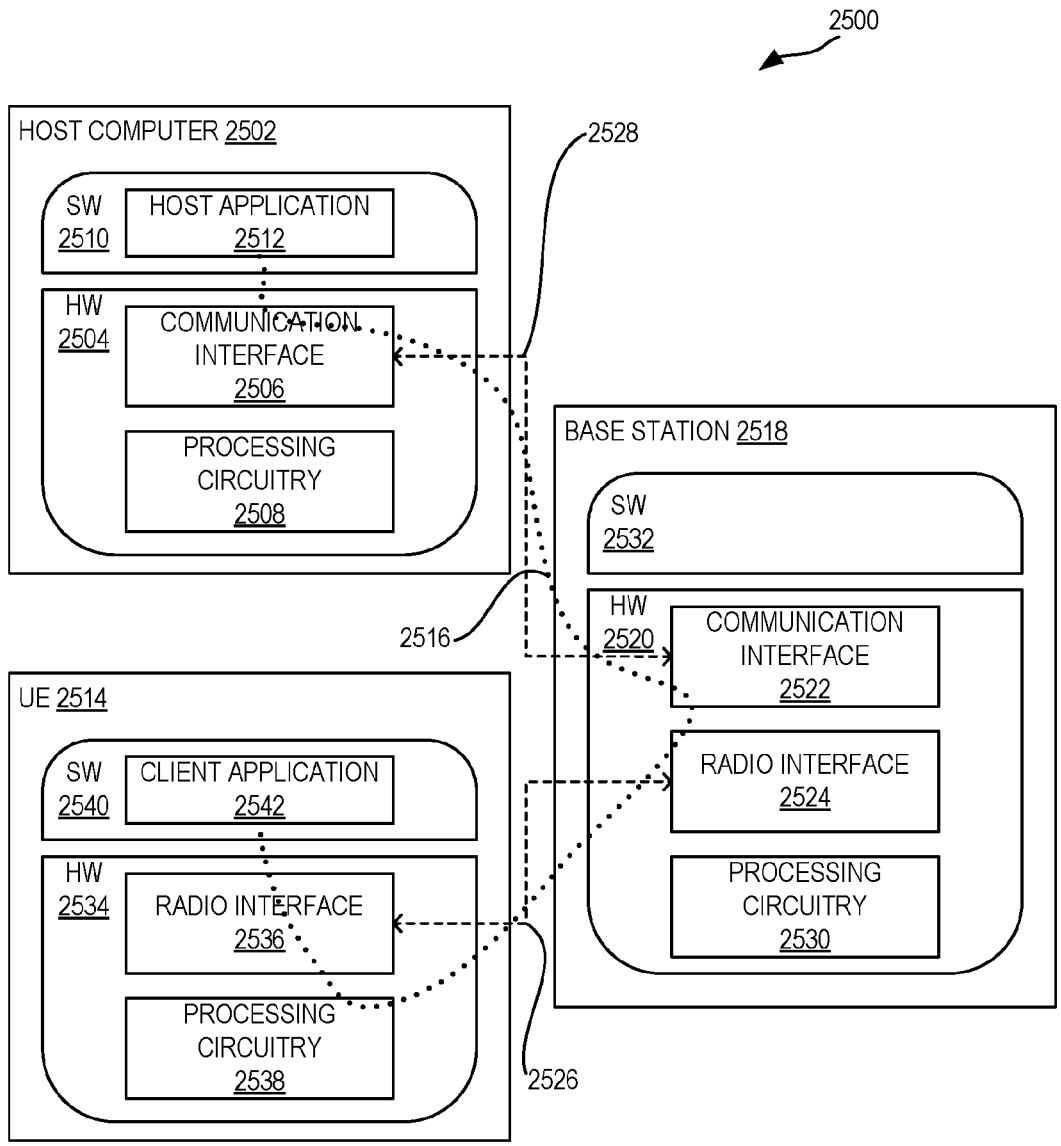
FIG. 25 illustrates example embodiments of the host computer, base station, and UE of FIG. 24.

It is noted that the host computer 2502, the base station 2518, and the UE 2514 illustrated in FIG. 25 may be similar or identical to the host computer 2416, one of the base stations 2406A, 2406B, 2406C, and one of the UEs 2412, 2414 of FIG. 24, respectively. This is to say, the inner workings of these entities may be as shown in FIG. 25 and independently, the surrounding network topology may be that of FIG. 24.

In FIG. 25, the OTT connection 2516 has been drawn abstractly to illustrate the communication between the host computer 2502 and the UE 2514 via the base station 2518 without explicit reference to any intermediary devices and the precise routing of messages via these devices. The network infrastructure may determine the routing, which may be configured to hide from the UE 2514 or from the service provider operating the host computer 2502, or both. While the OTT connection 2516 is active, the network infrastructure may further take decisions by which it dynamically changes the routing (e.g., on the basis of load balancing consideration or reconfiguration of the network).

The wireless connection 2526 between the UE 2514 and the base station 2518 is in accordance with the teachings of the embodiments described throughout this disclosure. One or more of the various embodiments improve the performance of OTT services provided to the UE 2514 using the OTT connection 2516, in which the wireless connection 2526 forms the last segment.

A measurement procedure may be provided for the purpose of monitoring data rate, latency, and other factors on which the one or more embodiments improve. There may further be an optional network functionality for reconfiguring the OTT connection 2516 between the host computer 2502 and the UE 2514, in response to variations in the measurement results. The measurement procedure and/or the network functionality for reconfiguring the OTT connection 2516 may be implemented in the software 2510 and the hardware 2504 of the host computer 2502 or in the software 2540 and the hardware 2534 of the UE 2514, or both. In some embodiments, sensors (not shown) may be deployed in or in association with communication devices through which the OTT connection 2516 passes; the sensors may participate in the measurement procedure by supplying values of the monitored quantities exemplified above, or supplying values of other physical quantities from which the software 2510, 2540 may compute or estimate the monitored quantities. The reconfiguring of the OTT connection 2516 may include message format, retransmission settings, preferred routing, etc.; the reconfiguring need not affect the base station 2518, and it may be unknown or imperceptible to the base station 2518. Such procedures and functionalities may be known and practiced in the art. In certain embodiments, measurements may involve proprietary UE signaling facilitating the host computer 2502's measurements of throughput, propagation times, latency, and the like. The measurements may be implemented in that the software 2510 and 2540 causes messages to be transmitted, in particular empty or 'dummy' messages, using the OTT connection 2516 while it monitors propagation times, errors, etc.

Figures 26, 27:
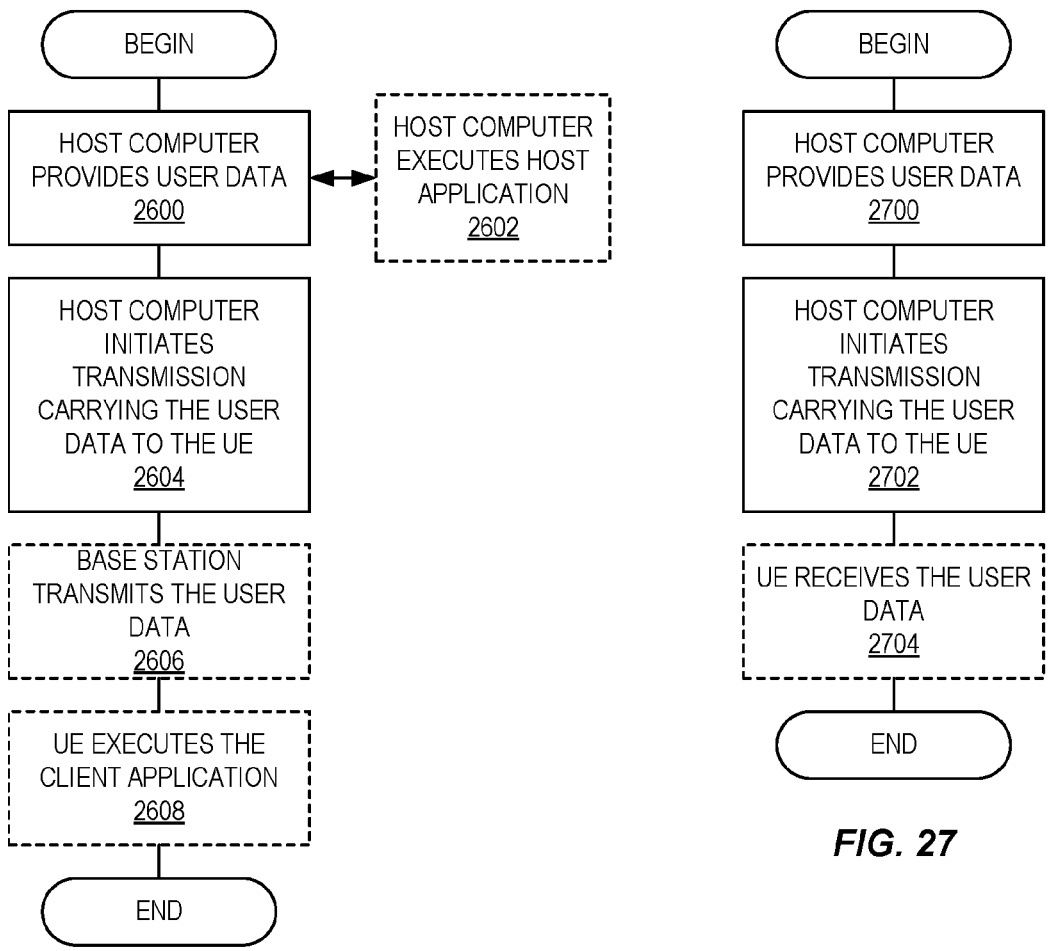

FIG. 26 is a flowchart illustrating a method implemented in a communication system, in accordance with one embodiment. The communication system includes a host computer, a base station, and a UE which may be those described with reference to FIGS. 24 and 25. For simplicity of the present disclosure, only drawing references to FIG. 26 will be included in this section. In step 2600, the host computer provides user data. In sub-step 2602 (which may be optional) of step 2600, the host computer provides the user data by executing a host application. In step 2604, the host computer initiates a transmission carrying the user data to the UE. In step 2606 (which may be optional), the base station transmits to the UE the user data which was carried in the transmission that the host computer initiated, in accordance with the teachings of the embodiments described throughout this disclosure. In step 2608 (which may also be optional), the UE executes a client application associated with the host application executed by the host computer.

FIG. 27 is a flowchart illustrating a method implemented in a communication system, in accordance with one embodiment. The communication system includes a host computer, a base station, and a UE which may be those described with reference to FIGS. 24 and 25. For simplicity of the present disclosure, only drawing references to FIG. 27 will be included in this section. In step 2700 of the method, the host computer provides user data. In an optional sub-step (not shown) the host computer provides the user data by executing a host application. In step 2702, the host computer initiates a transmission carrying the user data to the UE. The transmission may pass via the base station, in accordance with the teachings of the embodiments described throughout this disclosure. In step 2704 (which may be optional), the UE receives the user data carried in the transmission.

FIG. 28 is a flowchart illustrating a method implemented in a communication system, in accordance with one embodiment. The communication system includes a host computer, a base station, and a UE which may be those described with reference to FIGS. 24 and 25. For simplicity of the present disclosure, only drawing references to FIG. 28 will be included in this section. In step 2800 (which may be optional), the UE receives input data provided by the host computer. Additionally or alternatively, in step 2802, the UE provides user data. In sub-step 2804 (which may be optional) of step 2800, the UE provides the user data by executing a client application. In sub-step 2806 (which may be optional) of step 2802, the UE executes a client application which provides the user data in reaction to the received input data provided by the host computer. In providing the user data, the executed client application may further consider user input received from the user. Regardless of the specific manner in which the user data was provided, the UE initiates, in sub-step 2808 (which may be optional), transmission of the user data to the host computer. In step 2810 of the method, the host computer receives the user data transmitted from the UE, in accordance with the teachings of the embodiments described throughout this disclosure.

FIG. 29 is a flowchart illustrating a method implemented in a communication system, in accordance with one embodiment. The communication system includes a host computer, a base station, and a UE which may be those described with reference to FIGS. 24 and 25. For simplicity of the present disclosure, only drawing references to FIG. 29 will be included in this section. In step 2900 (which may be optional), in accordance with the teachings of the embodiments described throughout this disclosure, the base station receives user data from the UE. In step 2902 (which may be optional), the base station initiates transmission of the received user data to the host computer. In step 2904 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

EMBODIMENTS

Embodiment 1: A method for Downlink Control Information, DCI, transmission and reception using multiple transmission configuration indication, TCI, states, in a wireless network comprising at least one radio access node (802; 806) and at least one wireless communication device (812), the method comprising one or more of:
at a radio access node (802; 806), one or more of:
providing (1800), to a wireless communication device (812), one or more messages that activate a first TCI state and a second TCI state for a Control Resource Set, CORESET, comprising a first set of resource elements, REs, associated to the first TCI state and a second set of REs associated to the second TCI state; and
providing (1802), to the wireless communication device (812), a configuration of one or more of:
a search space, SS, set associated with the CORESET;
one or more aggregation levels, ALs; and
a number of Physical Downlink Control Channel, PDCCH, candidates for each AL in the SS set, wherein each PDCCH candidate comprises of (e.g., consists of) REs in the first set of REs and REs in the second set of REs; and
at the wireless communication device (812), one or more of:
receiving (1800) the one or more messages that activate the first TCI state and the second TCI state for the CORSET comprising the first set of REs associated to the first TCI state and the second set of REs associated to the second TCI state;
receiving (1802) the configuration of the SS set associated with the CORESET, the one or more ALs, and the number of PDCCH candidates for each AL in the SS set; and
receiving (1804) a DCI carried by either:
a single PDCCH in one of the number of PDCCH candidates that comprises REs in the first set of REs and REs in the second sets of REs; or
a first PDCCH (e.g., with an AL of 1) in the first set of REs and a second PDCCH (e.g., with an AL of 1) in the second set of REs.

Embodiment 2: The method of embodiment 1, wherein the CORESET further comprises a number of physical resource blocks, PRBs, in the frequency domain and a number of orthogonal frequency division multiplexing, OFDM, symbols in the time domain.

Embodiment 3: The method of embodiment 1 or 2, wherein the CORESET further comprises a number of resource element, RE, groups, REGs, each consisting of twelve REs in a resource block in an OFDM symbol in the CORESET and indexed first in ascending order of OFDM symbols and then in ascending order of RBs starting from the lowest RB in the CORESET.

Embodiment 4: The method of any one of embodiments 1 to 3, wherein the CORESET further comprises a number of REG bundles, REGBs, each consisting of a number of consecutive REGs.

Embodiment 5: The method of any one of embodiments 1 to 4, wherein the CORESET further comprises a number of control channel elements, CCEs, each consisting of a number of REGBs.

Embodiment 6: The method of any one of embodiments 1 to 5, wherein the first set of REs and the second set of REs are respectively a first set of REGs and a second set of REGs.

Embodiment 7: The method of embodiment 6, wherein the first set of REGs and the second sets of REGs are interleaved such that the first set of REGs are REGs with even numbered indices and the second set of REGs are REGs with odd numbered indices, or vice versa.

Embodiment 8: The method of embodiment 6, wherein one or more of the following may further apply: the CORESET further comprises a number of REG bundles, REGBs, each consisting of a number of consecutive REGs; and the first set of REGs consist of a first REG in each of the REGBs; and the second set of REGs consist of a second REG in each of the REGBs.

Embodiment 9: The method of embodiment 8, wherein the first REGs and the second REGs in each REGB are REGs in a first OFDM symbol and a second OFDM symbol, respectively.

Embodiment 10: The method of embodiment 9, wherein the first OFDM symbol(s) is different from the second OFDM symbol(s).

Embodiment 11: The method of embodiment 10, wherein the first OFDM symbol is the same as the second OFDM symbol if the number OFDM symbols in the CORESET is one.

Embodiment 12: The method of any one of embodiments 8 to 11, wherein the first REGs and the second REGs in each REGB are a first half and a second half of consecutive REGs, respectively.

Embodiment 13: The method of any one of embodiments 1 to 5, wherein the first set of REs and the second sets of REs are respectively a first set of REGBs and a second set of REGBs.

Embodiment 14: The method of embodiment 13, wherein the first set of REGBs are even numbered REGBs and the second set of REGBs are odd numbered REGBs, or vice versa.

Embodiment 15: The method of embodiment 13, wherein one or more of the following may further apply: the CORESET further comprises a number of control channel elements, CCEs, each consisting of a number of REGBs; and the first set of REGBs and the second set of REGBs are respectively a first REGB and a second REGB in each of the CCEs.

Embodiment 16: The method of embodiment 15, wherein the first REGBs in each of the CCEs and the second REGBs in each of the CCEs are respectively a first half and a second half of consecutive REGBs in each of the CCEs.

Embodiment 17: The method of any one of embodiments 1 to 5, wherein the first set of REs and the second set of REs are respectively a first set of CCEs and a second set of CCEs.

Embodiment 18: The method of embodiment 17, wherein the first set of CCEs are even numbered CCEs and the second set of CCEs are odd numbered CCEs, or vis versa.

Embodiment 19: The method of embodiment 17, wherein the first set of CCEs and the second set of CCEs are respectively a first half and a second half of consecutive CCEs (e.g., in the CORESET or a PDCCH candidate).

Embodiment 20: The method of any one of embodiments 1 to 19, wherein the first TCI state and the second TCI state are associated with a first downlink reference signal, RS, and a second downlink RS, respectively.

Embodiment 21: The method of any one of embodiments 1 to 20, wherein each of the PDCCH candidates comprises a number of CCEs.

Embodiment 22: The method of any one of embodiments 1 to 21, wherein receiving (1804) the DCI comprises receiving (1804) the DCI carried by the single PDCCH in the one of the number of PDCCH candidates comprising REs in the first set of REs and REs in the second sets of REs further comprises determining the first set of REs and the second sets of REs in a number of CCEs associated with the PDCCH candidate and performing channel estimation based on demodulation signal, DMRS, in the first set of REs and second set of REs in the CCEs by assuming quasi co-location, QCL, with a first and the second downlink RS, respectively.

Embodiment 23: The method of any one of embodiments 1 to 21, wherein receiving (1804) the DCI comprises receiving (1804) the DCI carried by the first PDCCH in the first set of REs and the second PDCCH in the second set of REs, and the first PDCCH is the same as the second PDCCH.

Embodiment 24: The method of embodiment 1 to 21, wherein receiving (1804) the DCI comprises receiving (1804) the DCI carried by the first PDCCH in the first set of REs and the second PDCCH in the second set of REs, and the first PDCCH and the second PDCCH are received in CCEs associated with one of the PDCCH candidates.

Embodiment 25: The method of embodiment 24, wherein the receiving (1804) the DCI carried by the first PDCCH in the first set of REs and the second PDCCH in the second set of REs further comprises determining the first set of REs and the second sets of REs in the CCEs and performing channel estimation based demodulation signal, DMRS, in the first and second sets of REs in the CCEs by assuming quasi co-location with the first or the second downlink RS, respectively.

Embodiment 26: The method of any one of embodiments 1 to 21 and 23 to 25, wherein receiving (1804) the DCI comprises receiving (1804) the DCI carried by the first PDCCH in the first set of REs and the second PDCCH in the second set of REs, and the first PDCCH and the second PDCCH are decoded together by combining signals received in the first and the second sets of REs in the CCEs after channel estimation, or separately.

Embodiment 27: The method of any one of embodiments 1 to 26, further comprising determining a time offset between reception of the DCI and a corresponding physical channel or signal as a number of symbols between a last symbol of the CORESET in the SS and a first symbol of the physical channel or signal.

Embodiment 28: The method of embodiment 26, wherein the first set of REs and the second set of REs in the CCEs for the first PDCCH and the second PDCCH are assumed not available for physical downlink share channel, PDSCH, scheduled by the DCI by the wireless communication device (812).

Embodiment 29: The method of any one of embodiments 1 to 28, wherein the first TCI state and the second TCI state are associated with a first downlink reference signal, RS, and a second downlink RS, respectively, and the method further comprises applying the first downlink RS as QCL source for PDSCH reception, pathloss RS for uplink power control, or link monitoring RS for link monitoring (e.g., if certain conditions are met and the CORESET has the lowest ID or lowest ID in a slot).

Group A Embodiments

Embodiment 30: A method of operation of a wireless communication device (812) for Downlink Control Information, DCI, reception using multiple transmission configuration indication, TCI, states, in a wireless network, the method comprising one or more of:
receiving (1800), from a radio access node (802; 806), one or more messages that activate a first TCI state and a second TCI state for a Control Resource Set, CORESET, comprising a first set of resource elements, REs, associated to the first TCI state and a second set of REs associated to the second TCI state;
receiving (1802), from a radio access node (802; 806), a configuration of one or more of:
  a search space, SS, set associated with the CORESET;
  one or more aggregation levels, ALs; and
  a number of Physical Downlink Control Channel, PDCCH, candidates for each AL in the SS set, wherein each PDCCH candidate comprises of (e.g., consists of) REs in the first set of REs and REs in the second set of REs; and
receiving (1804) a DCI carried by either:
  a single PDCCH in one of the number of PDCCH candidates that comprises REs in the first set of REs and REs in the second sets of REs; or
  a first PDCCH (e.g., with an AL of 1) in the first set of REs and a second PDCCH (e.g., with an AL of 1) in the second set of REs.

Embodiment 31: The method of embodiment 30, wherein the CORESET further comprises a number of physical resource blocks, PRBs, in the frequency domain and a number of orthogonal frequency division multiplexing, OFDM, symbols in the time domain.

Embodiment 32: The method of embodiment 30 or 31, wherein the CORESET further comprises a number of resource element, RE, groups, REGs, each consisting of twelve REs in a resource block in an OFDM symbol in the CORESET and indexed first in ascending order of OFDM symbols and then in ascending order of RBs starting from the lowest RB in the CORESET.

Embodiment 33: The method of any one of embodiments 30 to 32, wherein the CORESET further comprises a number of REG bundles, REGBs, each consisting of a number of consecutive REGs.

Embodiment 34: The method of any one of embodiments 30 to 33, wherein the CORESET further comprises a number of control channel elements, CCEs, each consisting of a number of REGBs.

Embodiment 35: The method of any one of embodiments 30 to 34, wherein the first set of REs and the second set of REs are respectively a first set of REGs and a second set of REGs.

Embodiment 36: The method of embodiment 35, wherein the first set of REGs and the second sets of REGs are interleaved such that the first set of REGs are REGs with even numbered indices and the second set of REGs are REGs with odd numbered indices, or vice versa.

Embodiment 37: The method of embodiment 35, wherein one or more of the following may further apply: the CORESET further comprises a number of REG bundles, REGBs, each consisting of a number of consecutive REGs; and the first set of REGs consist of a first REG in each of the REGBs; and the second set of REGs consist of a second REG in each of the REGBs.

Embodiment 38: The method of embodiment 37, wherein the first REGs and the second REGs in each REGB are REGs in a first OFDM symbol and a second OFDM symbol, respectively.

Embodiment 39: The method of embodiment 38, wherein the first OFDM symbol(s) is different from the second OFDM symbol(s).

Embodiment 40: The method of embodiment 39, wherein the first OFDM symbol is the same as the second OFDM symbol if the number OFDM symbols in the CORESET is one.

Embodiment 41: The method of any one of embodiments 37 to 40, wherein the first REGs and the second REGs in each REGB are a first half and a second half of consecutive REGs, respectively.

Embodiment 42: The method of any one of embodiments 30 to 34, wherein the first set of REs and the second sets of REs are respectively a first set of REGBs and a second set of REGBs.

Embodiment 43: The method of embodiment 42, wherein the first set of REGBs are even numbered REGBs and the second set of REGBs are odd numbered REGBs, or vice versa.

Embodiment 44: The method of embodiment 42, wherein one or more of the following may further apply: the CORESET further comprises a number of control channel elements, CCEs, each consisting of a number of REGBs; and the first set of REGBs and the second set of REGBs are respectively a first REGB and a second REGB in each of the CCEs.

Embodiment 45: The method of embodiment 44, wherein the first REGBs in each of the CCEs and the second REGBs in each of the CCEs are respectively a first half and a second half of consecutive REGBs in each of the CCEs.

Embodiment 46: The method of any one of embodiments 30 to 34, wherein the first set of REs and the second set of REs are respectively a first set of CCEs and a second set of CCEs.

Embodiment 47: The method of embodiment 46, wherein the first set of CCEs are even numbered CCEs and the second set of CCEs are odd numbered CCEs, or vis versa.

Embodiment 48: The method of embodiment 46, wherein the first set of CCEs and the second set of CCEs are respectively a first half and a second half of consecutive CCEs (e.g., in the CORESET).

Embodiment 49: The method of any one of embodiments 30 to 48, wherein the first TCI state and the second TCI state are associated with a first downlink reference signal, RS, and a second downlink RS, respectively.

Embodiment 50: The method of any one of embodiments 30 to 49, wherein each of the PDCCH candidates comprises a number of CCEs.

Embodiment 51: The method of any one of embodiments 30 to 49, wherein receiving (1804) the DCI comprises receiving (1804) the DCI carried by the single PDCCH in the one of the number of PDCCH candidates comprising REs in the first set of REs and REs in the second sets of REs further comprises determining the first set of REs and the second sets of REs in a number of CCEs associated with the PDCCH candidate and performing channel estimation based on demodulation signal, DMRS, in the first set of REs and second set of REs in the CCEs by assuming quasi co-location, QCL, with a first and the second downlink RS, respectively.

Embodiment 52: The method of any one of embodiments 30 to 50, wherein receiving (1804) the DCI comprises receiving (1804) the DCI carried by the first PDCCH in the first set of REs and the second PDCCH in the second set of REs, and the first PDCCH is the same as the second PDCCH.

Embodiment 53: The method of embodiment 30 to 50, wherein receiving (1804) the DCI comprises receiving (1804) the DCI carried by the first PDCCH in the first set of REs and the second PDCCH in the second set of REs, and the first PDCCH and the second PDCCH are received in CCEs associated with one of the PDCCH candidates.

Embodiment 54: The method of embodiment 53, wherein the receiving (1804) the DCI carried by the first PDCCH in the first set of REs and the second PDCCH in the second set of REs further comprises determining the first set of REs and the second sets of REs in the CCEs and performing channel estimation based demodulation signal, DMRS, in the first and second sets of REs in the CCEs by assuming quasi co-location with the first or the second downlink RS, respectively.

Embodiment 55: The method of any one of embodiments 30 to 50 and 52 to 54, wherein receiving (1804) the DCI comprises receiving (1804) the DCI carried by the first PDCCH in the first set of REs and the second PDCCH in the second set of REs, and the first PDCCH and the second PDCCH are decoded together by combining signals received in the first and the second sets of REs in the CCEs after channel estimation, or separately.

Embodiment 56: The method of any one of embodiments 30 to 55, further comprising determining a time offset between reception of the DCI and a corresponding physical channel or signal as a number of symbols between a last symbol of the CORESET in the SS and a first symbol of the physical channel or signal.

Embodiment 57: The method of any one of embodiments 52 to 55, wherein the first set of REs and the second set of REs in the CCEs for the first PDCCH and the second PDCCH are assumed not available for physical downlink share channel, PDSCH, scheduled by the DCI by the wireless communication device (812).

Embodiment 58: The method of any one of embodiments 30 to 57, wherein the first TCI state and the second TCI state are associated with a first downlink reference signal, RS, and a second downlink RS, respectively, and the method further comprises applying the first downlink RS as QCL source for PDSCH reception, pathloss RS for uplink power control, or link monitoring RS for link monitoring (e.g., if certain conditions are met and the CORESET has the lowest ID or lowest ID in a slot).

Embodiment 59: The method of any of the previous embodiments of Group A, further comprising: providing user data; and forwarding the user data to a host computer via the transmission to the base station.

Group B Embodiments

Embodiment 60: A method of operation of a radio access node (802; 806) for Downlink Control Information, DCI, transmission using multiple transmission configuration indication, TCI, states, in a wireless network, the method comprising one or more of:
providing (1800), to a wireless communication device (812), one or more messages that activate a first TCI state and a second TCI state for a Control Resource Set, CORESET, comprising a first set of resource elements, REs, associated to the first TCI state and a second set of REs associated to the second TCI state;
sending (1802), to the wireless communication device (812), a configuration of one or more of:
a search space, SS, set associated with the CORESET;
one or more aggregation levels, ALs; and
a number of Physical Downlink Control Channel, PDCCH, candidates for each AL in the SS set, wherein each PDCCH candidate comprises of (e.g., consists of) REs in the first set of REs and REs in the second set of REs; and
wherein a DCI is transmitted to the wireless communication device (812), and the DCI is carried by either:
a single PDCCH in one of the number of PDCCH candidates that comprises REs in the first set of REs and REs in the second sets of REs; or
a first PDCCH (e.g., with an AL of 1) in the first set of REs and a second PDCCH (e.g., with an AL of 1) in the second set of REs.

Embodiment 61: The method of any of the previous embodiments of Group B, further comprising: obtaining user data; and forwarding the user data to a host computer or a wireless communication device.

Group C Embodiments

Embodiment 62: A wireless communication device comprising: processing circuitry configured to perform any of the steps of any of the Group A embodiments; and power supply circuitry configured to supply power to the wireless communication device.

Embodiment 63: A radio access node comprising: processing circuitry configured to perform any of the steps of any of the Group B embodiments; and power supply circuitry configured to supply power to the radio access node.

Embodiment 64: A User Equipment, UE, comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 65: A communication system including a host computer comprising: processing circuitry configured to provide user data; and a communication interface configured to forward the user data to a cellular network for transmission to a User Equipment, UE; wherein the cellular network comprises a radio access node having a radio interface and processing circuitry, the radio access node's processing circuitry configured to perform any of the steps of any of the Group B embodiments.

Embodiment 66: The communication system of the previous embodiment further including the radio access node.

Embodiment 67: The communication system of the previous 2 embodiments, further including the UE, wherein the UE is configured to communicate with the radio access node.

Embodiment 68: The communication system of the previous 3 embodiments, wherein: the processing circuitry of the host computer is configured to execute a host application, thereby providing the user data; and the UE comprises processing circuitry configured to execute a client application associated with the host application.

Embodiment 69: A method implemented in a communication system including a host computer, a radio access node, and a User Equipment, UE, the method comprising: at the host computer, providing user data; and at the host computer, initiating a transmission carrying the user data to the UE via a cellular network comprising the radio access node, wherein the radio access node performs any of the steps of any of the Group B embodiments.

Embodiment 70: The method of the previous embodiment, further comprising, at the radio access node, transmitting the user data.

Embodiment 71: The method of the previous 2 embodiments, wherein the user data is provided at the host computer by executing a host application, the method further comprising, at the UE, executing a client application associated with the host application.

Embodiment 72: A User Equipment, UE, configured to communicate with a radio access node, the UE comprising a radio interface and processing circuitry configured to perform the method of the previous 3 embodiments.

Embodiment 73: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 74: The communication system of the previous embodiment, wherein the cellular network further includes a radio access node configured to communicate with the UE.

Embodiment 75: The communication system of the previous 2 embodiments, wherein: the processing circuitry of the host computer is configured to execute a host application, thereby providing the user data; and the UE's processing circuitry is configured to execute a client application associated with the host application.

Embodiment 76: A method implemented in a communication system including a host computer, a radio access node, and a User Equipment, UE, the method comprising: at the host computer, providing user data; and at the host computer, initiating a transmission carrying the user data to the UE via a cellular network comprising the radio access node, wherein the UE performs any of the steps of any of the Group A embodiments.

Embodiment 77: The method of the previous embodiment, further comprising at the UE, receiving the user data from the radio access node.

Embodiment 78: A communication system including a host computer comprising: communication interface configured to receive user data originating from a transmission from a User Equipment, UE, to a radio access node; wherein the UE comprises a radio interface and processing circuitry, the UE's processing circuitry configured to perform any of the steps of any of the Group A embodiments.

Embodiment 79: The communication system of the previous embodiment, further including the UE.

Embodiment 80: The communication system of the previous 2 embodiments, further including the radio access node, wherein the radio access node comprises a radio interface configured to communicate with the UE and a communication interface configured to forward to the host computer the user data carried by a transmission from the UE to the radio access node.

Embodiment 81: The communication system of the previous 3 embodiments, wherein: the processing circuitry of the host computer is configured to execute a host application; and the UE's processing circuitry is configured to execute a client application associated with the host application, thereby providing the user data.

Embodiment 82: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 83: A method implemented in a communication system including a host computer, a radio access node, and a User Equipment, UE, the method comprising: at the host computer, receiving user data transmitted to the radio access node from the UE, wherein the UE performs any of the steps of any of the Group A embodiments.

Embodiment 84: The method of the previous embodiment, further comprising, at the UE, providing the user data to the radio access node.

Embodiment 85: The method of the previous 2 embodiments, further comprising: at the UE, executing a client application, thereby providing the user data to be transmitted; and at the host computer, executing a host application associated with the client application.

Embodiment 86: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 87: A communication system including a host computer comprising a communication interface configured to receive user data originating from a transmission from a User Equipment, UE, to a radio access node, wherein the radio access node comprises a radio interface and processing circuitry, the radio access node's processing circuitry configured to perform any of the steps of any of the Group B embodiments.

Embodiment 88: The communication system of the previous embodiment further including the radio access node.

Embodiment 89: The communication system of the previous 2 embodiments, further including the UE, wherein the UE is configured to communicate with the radio access node.

Embodiment 90: The communication system of the previous 3 embodiments, wherein: the processing circuitry of the host computer is configured to execute a host application; and the UE is configured to execute a client application associated with the host application, thereby providing the user data to be received by the host computer.

Embodiment 91: A method implemented in a communication system including a host computer, a radio access node, and a User Equipment, UE, the method comprising: at the host computer, receiving, from the radio access node, user data originating from a transmission which the radio access node has received from the UE, wherein the UE performs any of the steps of any of the Group A embodiments.

Embodiment 92: The method of the previous embodiment, further comprising at the radio access node, receiving the user data from the UE.

Embodiment 93: The method of the previous 2 embodiments, further comprising at the radio access node, initiating a transmission of the received user data to the host computer.

Those skilled in the art will recognize improvements and modifications to the embodiments of the present disclosure. All such improvements and modifications are considered within the scope of the concepts disclosed herein.

The invention claimed is:

1. A method of operation of a wireless communication device for Downlink Control Information, DCI, reception using multiple transmission configuration indication, TCI, states, in a wireless network, the method comprising:
   receiving, from a radio access node, one or more messages that activate a first TCI state and a second TCI state for a Control Resource Set, CORESET, comprising a first set of resource elements, REs, associated to the first TCI state and a second set of REs associated to the second TCI state;
   receiving, from a radio access node, a configuration of:
      a search space, SS, set associated with the CORESET;
      one or more aggregation levels, ALs; and
      a plurality of Physical Downlink Control Channel, PDCCH, candidates comprising PDCCH candidates for each of the one or more ALs in the SS set, wherein each PDCCH candidate comprises REs in the first set of REs and REs in the second set of REs; and
   receiving a DCI carried by either:
      a single PDCCH in a PDCCH candidate of the plurality of PDCCH candidates, wherein the PDCCH candidate comprises REs in the first set of REs and REs in the second set of REs; or
      a first repetition of a PDCCH in the first set of REs and a second repetition of the PDCCH in the second set of REs.

2. The method of claim 1, wherein only one of the first and second TCI states is used for the purpose of defining a default TCI state for Physical Downlink Shared Channel, PDSCH.

3. The method of claim 1, wherein only one of the first and second TCI states is used for the purpose of defining a default TCI state for Physical Downlink Shared Channel, PDSCH, when a time offset between reception of a downlink DCI and a corresponding PDSCH is less than a threshold.

4. The method of claim 1, wherein the wireless communication device assumes that one or more Demodulation Reference Signal, DM-RS, ports of a Physical Downlink Shared Channel, PDSCH, of a serving cell are quasi co-located, QCL, with one or more reference signals with respect to one or more QCL parameters used for PDCCH quasi co-location indication in the first activated TCI state of the CORESET if the CORESET has a lowest CORESET identity, ID, in a latest slot in which one or more CORESETs within an active bandwidth part of the serving cell are monitored by the wireless communication device if a time offset between a downlink DCI scheduling the PDSCH and the PDSCH is less than a threshold.

5. The method of claim 1, wherein the CORESET further comprises a plurality of Resource Blocks, RBs, in the frequency domain and a number of Orthogonal Frequency Division Multiplexing, OFDM, symbols in the time domain.

6. The method of claim 5, wherein the CORESET further comprises a plurality of RE groups, REGs, each consisting of twelve REs in an RB in an OFDM symbol in the CORESET and indexed first in ascending order of OFDM symbols and then in ascending order of RBs starting from a lowest RB in the CORESET.

7. The method of claim 6, wherein the CORESET further comprises a number of REG bundles, REGBs, each consisting of one or more consecutive REGs.

8. The method of claim 7, wherein the CORESET further comprises a number of control channel elements, CCEs, each consisting of one or more of the plurality of REGBs.

9. The method of claim 1, wherein the first set of REs and the second set of REs are respectively a first set of REGs and a second set of REGs.

10. The method of claim 9, wherein a mapping of a REG to the first set of REGs associated to the first TCI state or the second set of REGs associated to the second TCI state is based on:
   (a) an index of the REG,
   (b) an Orthogonal Frequency Division Multiplexing, OFDM, symbol in which the REG is located,
   (c) a location of the REG within a respective REG bundle,
   (d) the REG bundle or a CCE to which the REG belongs,
   (e) a CORESET configuration of the CORESET on precoding granularity,
   (f) a CCE to REG mapping,
   (g) number of OFDM symbols; or
   (h) a combination of two or more of (a)-(g).

11. The method of claim 9, wherein the first set of REGs and the second sets of REGs are interleaved such that the first set of REGs are REGs with even numbered indices and the second set of REGs are REGs with odd numbered indices, or vice versa.

12. The method of claim 9, wherein:
   the CORESET further comprises a plurality of REG bundles, REGBs, each consisting of two or more REGs;
   the first set of REGs consists of a first REG in each of the REGBs; and the second set of REGs consists of a second REG in each of the REGBs.

13. The method of claim 12, wherein the first REG and the second REG in each REGB are REGs in a first OFDM symbol and a second OFDM symbol, respectively, wherein the first OFDM symbol and the second OFDM symbols are different OFDM symbols.

14. The method of claim 12, wherein the first REG and the second REG in each REGB are REGs in a same OFDM symbol.

15. The method of claim 12, wherein the first REGs in the plurality of REG bundles and the second REGs in the plurality of REG bundles are a first half and a second half of a plurality of consecutive REGs, respectively.

16. The method of claim 9, wherein:
the CORESET further comprises a plurality of REG bundles, REGBs, each consisting of two or more REGs;
the first set of REGs consists of a first k REGs in each of the REGBs; and
the second set of REGs consists of a second k REGs in each of the REGBs;
where k is an integer number equal to a number of REG bundles in the plurality of REG bundles divided by a number of activated TCI states for the CORESET.

17. The method of claim 9, wherein:
the CORESET further comprises a plurality of REG bundles, REGBs, each consisting of two or more REGs;
the first set of REGs consists of REGs in a first number of OFDM symbols of the CORESET; and
the second set of REGs consists of a remaining number of OFDM symbols of the CORESET.

18. A wireless communication device for Downlink Control Information, DCI, reception using multiple transmission configuration indication, TCI, states, in a wireless network, the wireless communication device comprising:
one or more transmitters;
one or more receivers; and
processing circuitry associated with the one or more transmitters and the one or more receivers, the processing circuitry configured to cause the wireless communication device to:
receive, from a radio access node, one or more messages that activate a first TCI state and a second TCI state for a Control Resource Set, CORESET, comprising a first set of resource elements, REs, associated to the first TCI state and a second set of REs associated to the second TCI state;
receive, from a radio access node, a configuration of:
a search space, SS, set associated with the CORESET;
one or more aggregation levels, ALs; and
a plurality of Physical Downlink Control Channel, PDCCH, candidates comprising PDCCH candidates for each of the one or more ALs in the SS set, wherein each PDCCH candidate comprises REs in the first set of REs and REs in the second set of REs; and
receive a DCI carried by either:
a single PDCCH in a PDCCH candidate of the plurality of PDCCH candidates, wherein the PDCCH candidate comprises REs in the first set of REs and REs in the second set of REs; or
a first repetition of a PDCCH in the first set of REs and a second repetition of the PDCCH in the second set of REs.

19. A method of operation of a radio access node for Downlink Control Information, DCI, transmission using multiple transmission configuration indication, TCI, states, in a wireless network, the method comprising:
providing, to a wireless communication device, one or more messages that activate a first TCI state and a second TCI state for a Control Resource Set, CORESET, comprising a first set of resource elements, REs, associated to the first TCI state and a second set of REs associated to the second TCI state;
sending, to the wireless communication device, a configuration of:
a search space, SS, set associated with the CORESET;
one or more aggregation levels, ALs; and
a plurality of Physical Downlink Control Channel, PDCCH, candidates comprising PDCCH candidates for each of the one or more ALs in the SS set, wherein each PDCCH candidate comprises REs in the first set of REs and REs in the second set of REs; and
wherein a DCI is transmitted to the wireless communication device, and the DCI is carried by either:
a single PDCCH in a PDCCH candidate of the plurality of PDCCH candidates, wherein the PDCCH candidate comprises REs in the first set of REs and REs in the second set of REs; or
a first repetition of a PDCCH in the first set of REs and a second PDCCH a second repetition of the PDCCH in the second set of REs.

20. A radio access node for Downlink Control Information, DCI, transmission using multiple transmission configuration indication, TCI, states, in a wireless network, the radio access node comprising processing circuitry configured to cause the radio access node to:
provide, to a wireless communication device, one or more messages that activate a first TCI state and a second TCI state for a Control Resource Set, CORESET, comprising a first set of resource elements, REs, associated to the first TCI state and a second set of REs associated to the second TCI state;
send, to the wireless communication device, a configuration of:
a search space, SS, set associated with the CORESET;
one or more aggregation levels, ALs; and
a plurality of Physical Downlink Control Channel, PDCCH, candidates comprising PDCCH candidates for each of the one or more ALs in the SS set, wherein each PDCCH candidate comprises REs in the first set of REs and REs in the second set of REs; and
wherein a DCI is transmitted to the wireless communication device, and the DCI is carried by either:
a single PDCCH in a PDCCH candidate of the plurality of PDCCH candidates, wherein the PDCCH candidate comprises REs in the first set of REs and REs in the second set of REs; or
a first repetition of a PDCCH in the first set of REs and a second PDCCH a second repetition of the PDCCH in the second set of REs.

* * * * *